US008424207B2

(12) United States Patent
Nakano et al.

(10) Patent No.: US 8,424,207 B2
(45) Date of Patent: Apr. 23, 2013

(54) METHOD OF MAKING A COMPOSITE COMPONENT AND APPARATUS

(75) Inventors: Takashi Nakano, Columbus, OH (US); Hiroshi Akiyama, Dublin, OH (US); Brent Andrees, Dublin, OH (US); Brad Klein, Marysville, OH (US); Charles Gagliano, Hilliard, OH (US); Ryan Joseph Phillips, Marysville, OH (US); Steven Behm, Hilliard, OH (US); Kyle Pearce, Dublin, OH (US); Martyn Morrish, Dublin, OH (US); Allen Sheldon, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 12/258,911

(22) Filed: Oct. 27, 2008

(65) Prior Publication Data

US 2010/0101090 A1    Apr. 29, 2010

(51) Int. Cl.
*B21D 53/88* (2006.01)
*B22D 17/00* (2006.01)

(52) U.S. Cl.
USPC ............ 29/897.2; 29/412; 164/129; 164/303

(58) Field of Classification Search ............ 29/412–415, 29/417, 428, 897.2; 164/119, 265, 129, 303
See application file for complete search history.

(56) References Cited

U.S. PATENT DOCUMENTS

| | | | | |
|---|---|---|---|---|
| 3,037,242 A * | 6/1962 | Eudier | ............................. | 425/79 |
| 3,037,271 A * | 6/1962 | Schilberg | ........................ | 29/415 |
| 5,311,960 A | 5/1994 | Kukainis et al. | | |
| 5,592,848 A * | 1/1997 | Bodnar | ........................ | 72/379.2 |
| 5,707,100 A | 1/1998 | Suyama et al. | | |
| 5,730,204 A * | 3/1998 | Shimmell | ..................... | 164/312 |
| 5,931,520 A | 8/1999 | Seksaria et al. | | |
| 6,213,504 B1 | 4/2001 | Isano et al. | | |
| 6,488,330 B2 | 12/2002 | Hedderly | | |
| 6,644,690 B2 | 11/2003 | Brownlee et al. | | |
| 6,669,273 B1 * | 12/2003 | Glovatsky et al. | ........ | 296/193.02 |
| 7,172,238 B2 * | 2/2007 | Bodin et al. | ................ | 296/146.6 |
| 2002/0138987 A1* | 10/2002 | Nees | ........................ | 29/897.312 |
| 2004/0195860 A1* | 10/2004 | Koellner et al. | ........... | 296/146.5 |
| 2005/0217913 A1 | 10/2005 | Sakamoto | | |

(Continued)

FOREIGN PATENT DOCUMENTS

| DE | 10220025 | 11/2003 |
|---|---|---|
| DE | 10029813 | 4/2005 |

(Continued)

OTHER PUBLICATIONS

European Search Report dated May 3, 2010 from European Application No. 09174044.9.
Russian Office Action issued Sep. 24, 2010 in Russian Application No. 2009139490.
European Office Action Mailed Sep. 29, 2010 in European Application No. 09 174 044.9.

(Continued)

*Primary Examiner* — Alexander P Taousakis
(74) *Attorney, Agent, or Firm* — Plumsea Law Group, LLC; Mark E. Duell

(57) ABSTRACT

A method of making a composite component and the composite component is disclosed. The composite component can comprise multiple portions with different materials. By configuring the composite component with different materials, the weight of the composite component can be reduced while maintaining the strength and support of the composite component for a cockpit assembly. Furthermore, the method provides for an increase in the efficiency of the die casting process used to create the composite component.

23 Claims, 18 Drawing Sheets

U.S. PATENT DOCUMENTS

| | | | |
|---|---|---|---|
| 2006/0038424 A1 | 2/2006 | Aoki et al. | |
| 2006/0061199 A1 | 3/2006 | Kong | |
| 2006/0186650 A1 | 8/2006 | Kuwano et al. | |
| 2006/0278453 A1 | 12/2006 | Moll et al. | |
| 2006/0283643 A1 | 12/2006 | Simonds et al. | |
| 2007/0024090 A1 | 2/2007 | Vander Sluis et al. | |
| 2007/0080563 A1* | 4/2007 | Eipper et al. | 296/193.06 |
| 2010/0086346 A1* | 4/2010 | Kruse et al. | 403/122 |

FOREIGN PATENT DOCUMENTS

| | | |
|---|---|---|
| DE | 10029813 B4 | 4/2005 |
| GB | 2379638 | 3/2003 |
| JP | H0170688 | 5/1989 |
| RU | 47816 | 9/2005 |

OTHER PUBLICATIONS

European Office Action dated Feb. 2, 2012 in European Patent Application No. 09 174 044.9.

European Office Action dated Sep. 10, 2012 in European Patent Application No. 09 174 044.9.

Japanese Office Action dated Jun. 5, 2012 in Japanese Patent Application No. 2009-247049.

Notification of the Decision to Grant a Patent Right for Patent for Invention dated Jun. 6, 2012 in Chinese Patent Application No. 200910207009.9.

Chinese Office Action dated Oct. 19, 2011 in Chinese Patent Application No. 200910207009.9.

* cited by examiner

METHOD OF MAKING A COMPOSITE COMPONENT AND APPARATUS

BACKGROUND OF THE INVENTION

1. Field of the Invention

The present invention relates to a method of making composite components and a composite component that can be used in a motor vehicle.

2. Description of Related Art

Cockpit assemblies for a motor vehicle can include an instrument panel and a cross-beam to support the instrument panel. Often, the cross-beam can be specifically designed to support a steering column. In many cases, the cross-beam is a single die-cast beam made of a metal or metal alloy.

SUMMARY OF THE INVENTION

A composite component is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a composite component, comprising: a first component portion and a second component portion; a third component portion extending between the first component portion and the second component portion; the first component portion and the second component portion being made of a material including magnesium and the third component portion is made of a material including aluminum; and where the first component portion and the second component portion comprise a substantial majority of the composite component.

In another aspect, the invention provides a composite component for a cockpit assembly of a motor vehicle, comprising: a first component portion configured to attach to a first lateral side of a motor vehicle; the first component portion including at least one hole that is configured to support a component of a center console of the motor vehicle; a second component portion configured to attach to a second lateral side of a motor vehicle, the second component portion being spaced apart from the first component portion; a third component portion extending in a substantially lateral direction between the first component portion and the second component portion, the third component portion being configured to connect the first component portion to the second component portion; and where the first component portion and the second component portion are made of a material including magnesium and wherein the third component portion is made of a material including aluminum.

In another aspect, the invention provides a method of making components for a motor vehicle, comprising the steps of: using a die assembly to form a compound portion, the compound portion comprising a first component portion integrally formed with a second component portion; separating the first component portion from the second component; and attaching the first component portion to a first predetermined region of the motor vehicle and attaching the second component portion to a second predetermined region of the motor vehicle.

In another aspect, the invention provides a method of making a composite component, comprising the steps of: forming a first component portion and a second component portion from a first cavity and a second cavity associated with a die assembly, the first cavity being separated from the second cavity by a first distance; inserting a third component portion between the first component portion and the second component portion and forming the composite component; and where the first component portion is separated from the second component portion by a second distance that is substantially larger than the first distance.

In another aspect, the invention provides a method of making components for a motor vehicle, comprising the steps of: using a die assembly to form a compound portion made of a first material, the compound portion comprising a first portion integrally formed with a second portion; separating the first portion from the second portion; assembling the first portion with a third portion made of a second material and thereby forming a composite component, the second material being different from the first material; and attaching the composite component to a first predetermined region of the motor vehicle and attaching the second component to a second predetermined region of the motor vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
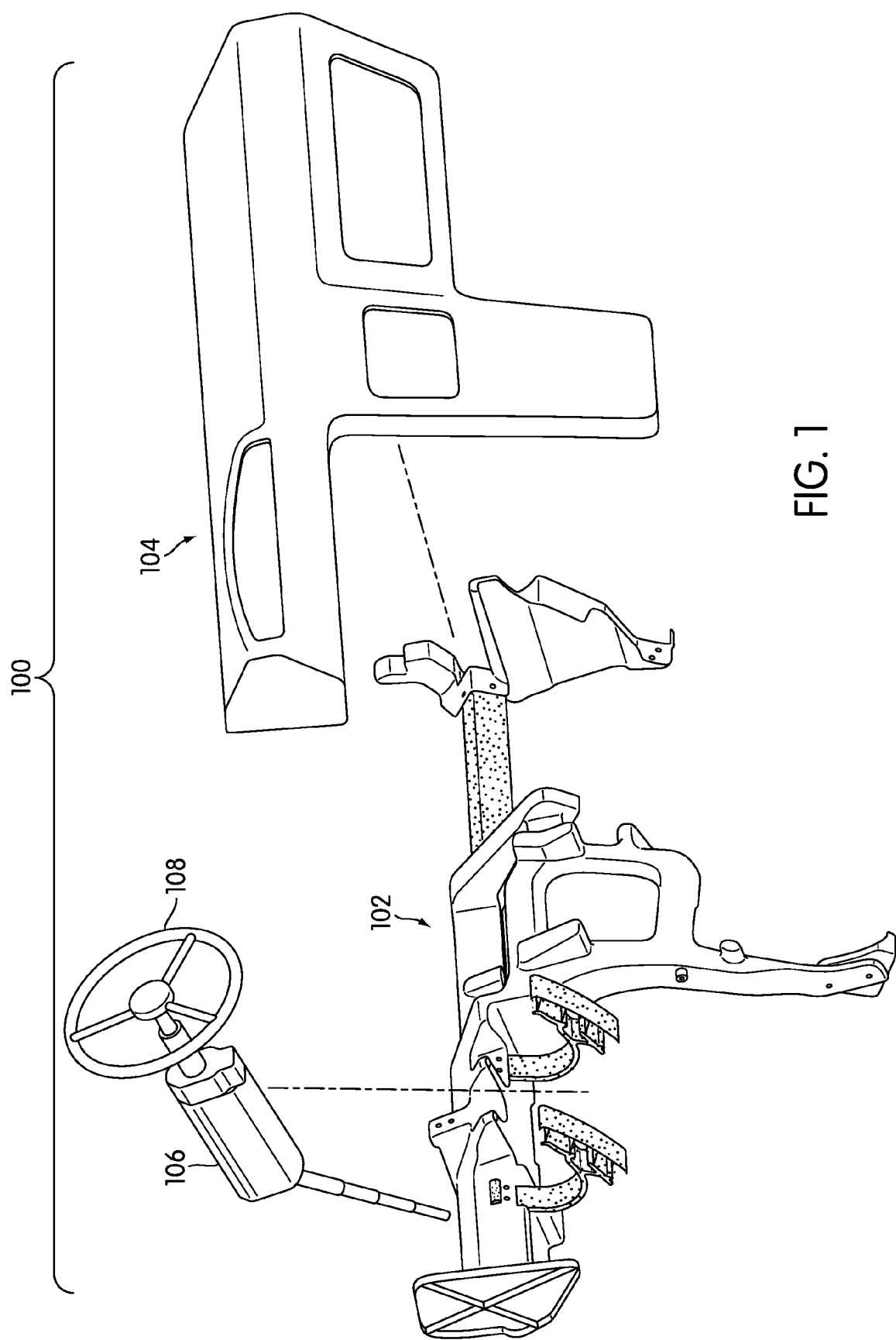
FIG. 1 is an exploded isometric view of an embodiment of a cockpit assembly.

FIG. 1 is an exploded isometric view of an embodiment of cockpit assembly 100 for a motor vehicle (not shown). In some embodiments, cockpit assembly 100 can include composite component 102 and instrument panel 104. In the current embodiment, composite component 102 is shown as a steering hanger beam for a motor vehicle. However, it should be understood that in other embodiments, a composite component may not be used in conjunction with a motor vehicle. In other words, a composite component may be used in any type of structural member.

Instrument panel 104 may configured to accommodate various instruments that are used in operating a motor vehicle. For example, instrument panel 104 can include a plurality of indicators that are used to indicate vehicle speed, fuel levels, engine temperature, as well as other information. Instrument panel 104 could also include buttons for operating various systems, such as climate control systems, audio systems, navigation systems, as well as other types of systems. Furthermore, in different embodiments, instrument panel 104 could include additional indicators, buttons, displays, compartments or other features commonly found on an instrument panel of a motor vehicle cockpit assembly. For purposes of clarity, instrument panel 104 is shown schematically in this embodiment.

Composite component 102 may be configured to provide support to instrument panel 104. In particular, composite component 102 is configured to attach directly to a frame or subframe of a motor vehicle. With this arrangement, instrument panel 104 can be mounted to composite component 102. In other embodiments, cockpit assembly 100 could include one or more intermediate members that are disposed between instrument panel 104 and composite component 102.

In some embodiments, composite component 102 can also be associated with a steering column. In one embodiment, composite component 102 may be associated with steering column 106. In some cases, steering column 106 may be configured to receive steering wheel 108. Details of the mounting provisions disposed on composite component 102 for receiving steering column 106 are discussed in detail below.

Figure 2:
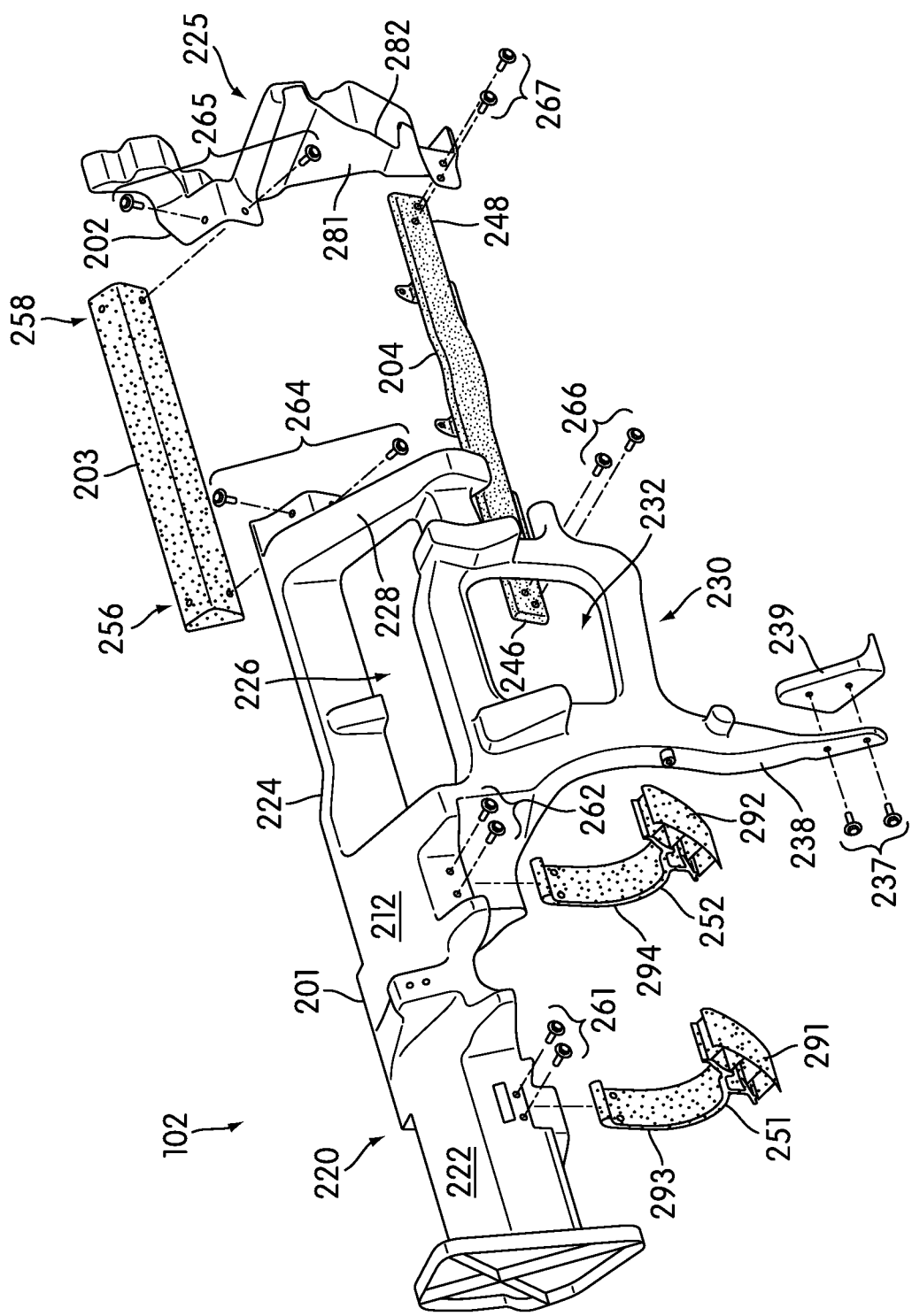
FIG. 2 is an exploded isometric view of an embodiment of a composite component.
Figure 3:
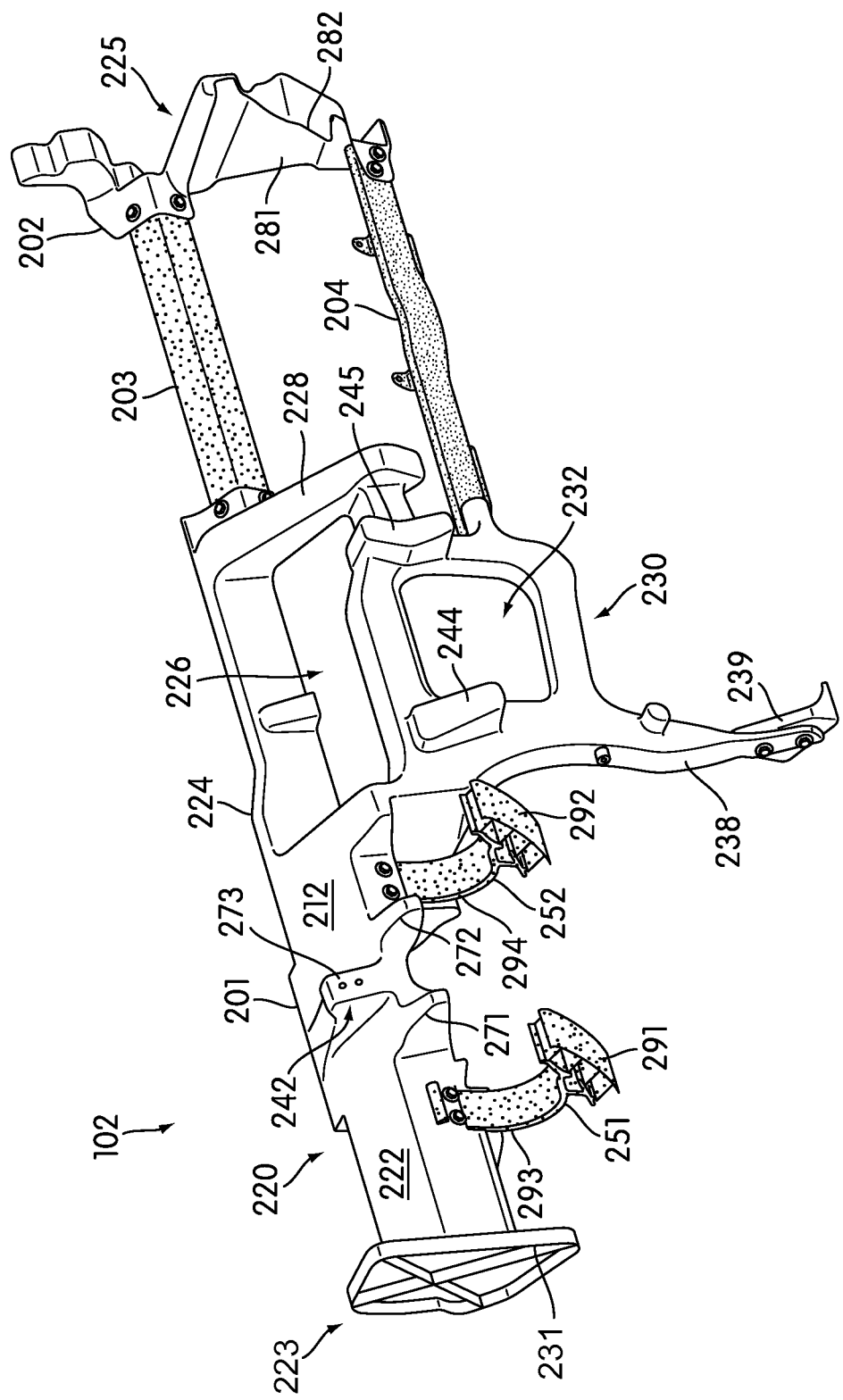
FIG. 3 is a front assembled isometric view of an embodiment of a composite component.
Figure 4:
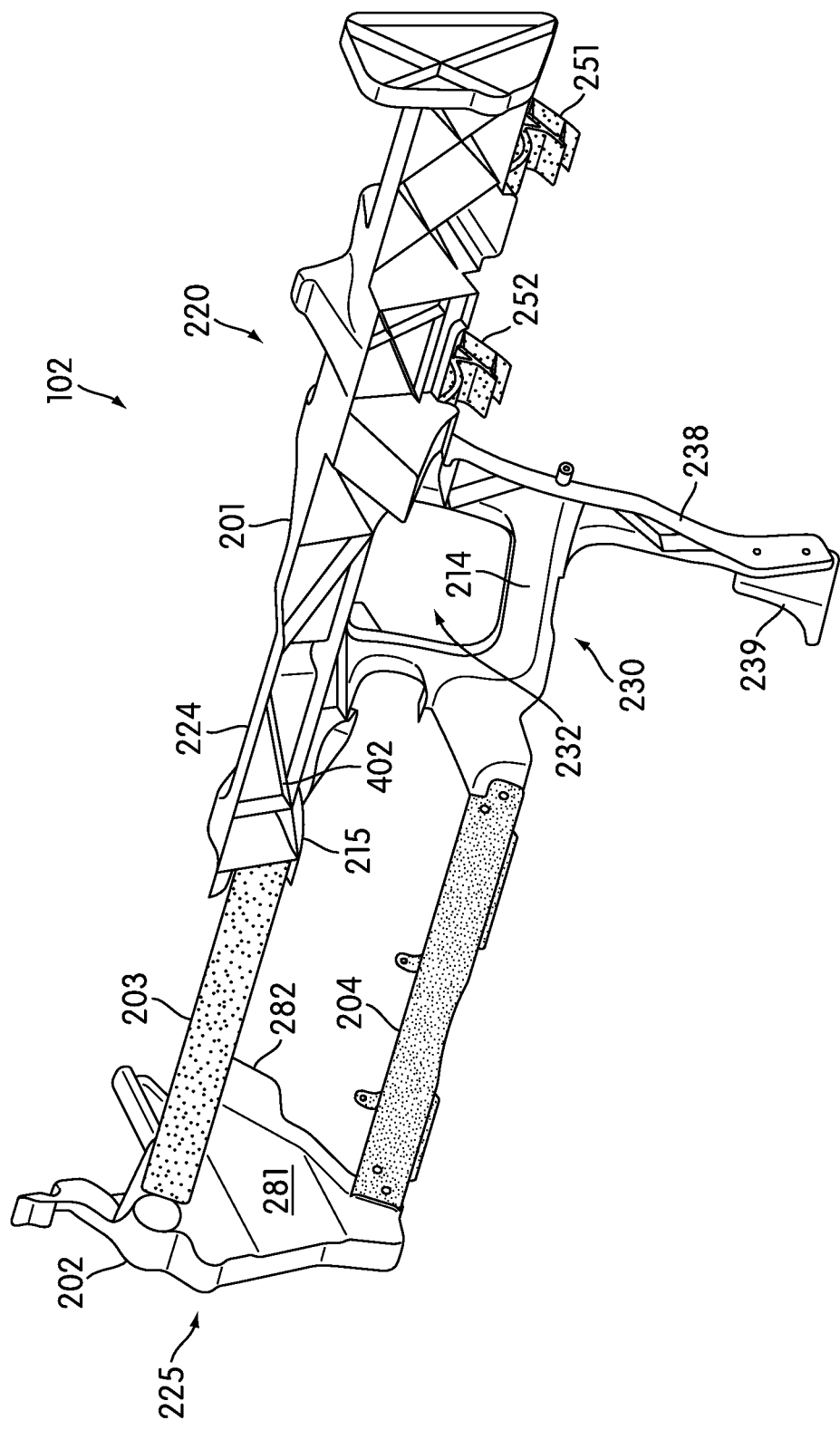
FIG. 4 is a rear assembled isometric view of an embodiment of a composite component.

FIG. 2 illustrates an exploded isometric view of an embodiment of composite component 102. Additionally, FIGS. 3 and 4 illustrate front and rear assembled isometric views, respectively, of an embodiment of composite component 102. Referring to FIGS. 2-4, composite component 102 comprises multiple distinct components.

Composite component 102 may comprise one or more component portions. In some cases, composite component 102 can comprise a single component portion. In other cases, composite component 102 can comprise two component portions. In still other cases, composite component 102 can comprise more than two component portions. In an exemplary embodiment, composite component 102 can comprise at least three component portions. In particular, composite component 102 can include first component portion 201, second component portion 202 and third component portion 203. In some cases, first component portion 201, second component portion 202 and third component portion 203 are each monolithic component portions.

In some embodiments, composite component 102 can also include fourth component portion 204. In some cases, fourth component portion 204 may provide additional stability and rigidity to composite component 102. In other words, fourth composite portion 204 may be part of the frame of composite component 102. In other cases, however, fourth component portion 204 may be a bracket that does not substantially enhance the structural integrity of composite component 102. Instead, in some cases, fourth component portion 204 can be provided only as a bracket to facilitate mounting of one or more components of an instrument panel. In still other embodiments, composite component 102 may not include fourth component portion 204.

First component portion 201 includes exterior surface 212. First component portion 201 also includes interior surface 214 that is disposed opposite of exterior surface 212, which can be clearly seen in FIG. 4. Exterior surface 212 may face towards a cabin of a motor vehicle, while interior surface 214 may face towards an engine compartment of a motor vehicle.

In one embodiment, exterior surface 212 may be a substantially convex surface. In some cases, exterior surface 212 may be a contoured surface with few edges. In other cases, exterior surface 212 may include substantially planar surfaces that are joined at edges. In another embodiment, exterior surface 212 could be a substantially concave surface. In still another embodiment, exterior surface 212 could be a substantially flat surface with little or no curvature.

As clearly seen in FIG. 4, in one embodiment interior surface 214 may be a substantially concave surface. In some cases, interior surface 214 may include peripheral flange 215 that extends away from exterior surface 212. Likewise, interior surface 214 can include a plurality of support ribs 402 that help to increase the strength and stability of first component portion 201. In another embodiment, however, interior surface 214 may be a substantially convex surface. In still another embodiment, interior surface 214 may be a substantially flat surface with little or no curvature.

Generally, first component portion 201 can have any shape. In some embodiments, first component portion 201 can comprise a single substantially straight beam portion that extends in a lateral direction. The term "lateral direction" as used here refers to a direction that extends between two sides of a motor vehicle. In other embodiments, first component portion 201 can include one or more portions that extend in a direction perpendicular to the lateral direction.

In an exemplary embodiment, first component portion 201 includes upper portion 220 that extends in a generally lateral direction. In some embodiments, the thickness of upper portion 220 may vary. For example, first lateral portion 222 of upper portion 220 may be substantially thicker than intermediate portion 224 of upper portion 220. In particular, the thickness of intermediate portion 224 may be reduced to make room for first gap 226 that is open on an upper surface of first component portion 201. Furthermore, intermediate portion 224 may also include first arm portion 228 that extends in a direction towards an instrument panel and helps define first gap 226.

First component portion 201 may also include lower portion 230 that extends away from upper portion 220 in a perpendicular direction. In some cases, lower portion 230 may extend towards a floor of a motor vehicle. In other cases, lower portion 230 may have a square shape that includes second gap 232. Also, lower portion 230 can help define an edge of first gap 226.

In an embodiment, lower portion 230 can further include leg portion 238 that extends further towards a floor of a motor vehicle. In some cases, leg portion 238 can help provide support in a vertical direction for composite component 102. Although the current embodiment only includes a single leg portion, in other embodiments, lower portion 230 could include a second leg portion that opposes leg portion 238.

Composite component 102 can also include second component portion 202 that is associated with a lateral end of composite component 102. In some cases, second component portion 202 may include base portion 281. Second component portion 202 may also include flange portion 282 that extends in a perpendicular manner to base portion 281.

Composite component 102 includes third component portion 203 disposed through second lateral portion 225. In some embodiments, third component portion 203 may be a beam or bar that extends in a substantially lateral direction. In some cases, third component portion 203 can extend between first component portion 201 and second component portion 202. In some cases, third component portion 203 can be arranged as a substantially continuous extension of upper portion 220 of first component portion 201. With this arrangement, first component portion 201, second component portion 202 and third component portion 203 can be configured to extend across the lateral width of a motor vehicle and provide support over the entirety of an instrument panel.

Composite component 102 can also include fourth component portion 204 disposed through second lateral portion 225. In some cases, fourth component portion 204 can extend in a substantially lateral direction. In one embodiment, fourth component portion 204 may be substantially parallel with third component portion 203. With this arrangement, fourth component portion 204 can provide additional support along second lateral portion 225 of composite component 102.

In some embodiments, third component portion 203 and fourth component portion 204 can facilitate the mounting of one or more components. For example, in one embodiment, third component portion 203 and fourth component portion 204 can be arranged to form a frame for a glove box. In another embodiment, third component portion 203 and fourth component portion 204 can be configured to receive and/or support a radio chassis. In some cases, third component portion 203 and fourth component portion 204 can include fastening holes and/or other fastening brackets.

A composite component can include provisions for absorbing energy during a collision. In some cases, a composite component can include knee bolsters that are configured to deform during an impact and help protect a driver. In an exemplary embodiment, a composite component can include two knee bolsters that are associated with a steering column. In other embodiments, a composite component may not include knee bolsters.

In this exemplary embodiment, first component portion 201 of composite component 102 includes first knee bolster 251 and second knee bolster 252. In different embodiments, first knee bolster 251 and second knee bolster 252 can have any shape. In one embodiment, first knee bolster 251 and second knee bolster 252 can include first knee pad 291 and second knee pad 292, respectively. Likewise, first knee pad 291 and second knee pad 292 can be supported by first flange 293 and second flange 294, respectively, which connect directly to first component portion 201.

First component portion 201 can also include bracket portion 239 that is configured to attach to leg portion 238. In an exemplary embodiment, bracket portion 239 may be configured to attach directly to a floor of a motor vehicle. With this arrangement, bracket portion 239 can facilitate in mounting composite component 102 with a floor of the motor vehicle to enhance stability of composite component 102. In other cases, bracket portion 239 may be configured to associate with a center console of a motor vehicle.

A composite component can include provisions for assembling separate portions to one another. In some cases, multiple sets of fasteners can be used to attach different portions. In other cases, some portions can be welded together. In still other cases, a combination of fasteners and welding can be used to assemble a composite component. In an exemplary embodiment, multiple sets of fasteners can be used to attach different portions. For purposes of clarity, some of the fasteners used to assemble distinct components of composite component 102 are illustrated. However, it should be understood that in some cases composite component 102 could be provided with additional fasteners for assembling various components.

Referring to FIG. 2, the assembly of composite component 102 is illustrated in detail. In this exemplary embodiment, third component portion 203 can be assembled with first component portion 201 and second component portion 202 using first fastener set 264 and second fastener set 265. In particular, first end portion 256 of third component portion 203 can be assembled with first component portion 201 with first fastener set 264. In some cases, first fastener set 264 may be a set of bolts that insert through fastening holes on first component portion 201 and third component portion 203. In different embodiments, the number of fasteners in first fastener set 264 may vary. In an exemplary embodiment, first fastener set 264 can include two fasteners.

Likewise, second end portion 258 of third component portion 203 can be assembled with second component portion 202 using second fastener set 265. In some cases, second fastener set 265 may be a set of bolts that insert through fastening holes on second component portion 202 and third component portion 203. In different embodiments, the number of fasteners in second fastener set 265 may vary. In an exemplary embodiment, second fastener set 265 can include two fasteners.

In a similar manner, fourth component portion 204 can be assembled with first component portion 201 and second component portion 202 using third fastener set 266 and fourth fastener set 267. In particular, first end portion 246 of fourth component portion 204 can be assembled with first component portion 201 with third fastener set 266. In some cases, third fastener set 266 may be a set of bolts that insert through fastening holes on first component portion 201 and fourth component portion 204. In different embodiments, the number of fasteners in third fastener set 266 may vary. In an exemplary embodiment, third fastener set 266 can include two fasteners.

Likewise, second end portion 248 of fourth component portion 204 can be assembled with second component portion 202 with fourth fastener set 267. In some cases, fourth fastener set 267 may be a set of bolts that insert through fastening holes on second component portion 202 and fourth component portion 204. In different embodiments, the number of fasteners in fourth fastener set 267 may vary. In an exemplary embodiment, fourth fastener set 267 can include two fasteners.

First knee bolster 251 and second knee bolster 252 can be attached to first component portion 201 using fifth fastener set 261 and sixth fastener set 262, respectively. In some cases, fifth fastener set 261 can be a set of bolts that insert through fastening holes on first knee bolster 251 and first component portion 201. Likewise, sixth fastener set 262 can be a set of bolts that insert through fastening holes on second knee bolster 252 and first component portion 201.

In some embodiments, bracket portion 239 can be attached to leg portion 238 using seventh fastener set 237. In some cases, seventh fastener set 237 can include one or more bolts that insert through fastening holes in leg portion 238 and bracket portion 239.

In embodiments where a composite component is associated with many small parts, the composite component can include provisions for reducing the number of distinct parts required to manufacture the composite component. For example, a composite component can include a plurality of integrally molded portions that are configured to associate with one or more components of the cockpit assembly in order to facilitate fastening of the cockpit assembly. In some cases, an exterior surface of a composite component can include raised portions, recessed portions or other integrally molded portions that may fit with other components of a cockpit assembly. Furthermore, these integrally molded portions can be configured with any sizes and/or shapes. By using integrally molded portions, the number of parts used for making a composite component can be reduced. Additionally, a more efficient manufacturing process can be realized by maximizing the space used in a die for parts that are die casted.

Referring to FIG. 3, exterior surface 212 can include one or more integrally molded portions for integrating with components of a cockpit assembly. In some cases, exterior surface 212 can include first molded portion 244 and second molded portion 245. First molded portion 244 and second molded portion 245 can be used to associate exterior surface 212 with an instrument panel or other components of a cockpit assembly.

Exterior surface 212 can also include integrally molded portions for associating with a steering column. In particular, first component portion 201 may include column mounting portion 242 that is configured to receive a steering column. In different embodiments, column mounting portion 242 can have shapes that vary. In this embodiment, column mounting portion 242 is configured with first side portion 271 and second side portion 272 that can provide support to the sides of a steering column. Also, column mounting portion 242 can include fastening projection 273. In some cases, fastening projection 273 can include fastening holes for fixedly mounting the steering column.

First component portion 201 can include provisions for mounting with a frame of a motor vehicle. In some cases, first component portion 201 can include mounting plate 231 that is integrally mounted with first component portion 201. Mounting plate 231 may be oriented perpendicular to upper portion 220 at first lateral side 223 of composite component 102.

It should be understood that in other embodiments, a composite component can include additional integrally mounted portions. For example, in another embodiment, a radio bracket could be integrally molded with a component portion of the composite component. In still another embodiment, one or more knee bolsters could be integrally molded with a component portion of the composite component.

In some embodiments, a composite component can include provisions to help reduce manufacturing costs and/or decrease the weight of the composite component to improve vehicle performance. In some embodiments, a composite component can be constructed with more than one type of material. In some cases, the composite component can be made of two different materials. In other cases, the composite component can be made of three different materials. In still other cases, the composite component can be made of more than three different materials. By using different materials at different portions of a composite component, both the manufacturing costs and overall weight of the composite component can be reduced.

In different embodiments, the materials used to make a composite component can vary. Examples of materials that can be used to make a composite component include, but are not limited to, steel, aluminum, aluminum alloys, magnesium, magnesium alloys as well as other materials.

In an exemplary embodiment, composite component 102 can be made of two distinct materials. In some cases, first component portion 201 and second component portion 202 can be made of a first material. Also, third component portion 203 and fourth component portion 204 can be made of a second material that is different from the first material. In one embodiment, first component portion 201 and second component portion 202 can be made of a material including magnesium. For example, in one embodiment, first component portion 201 and second component portion 202 can be made of a magnesium alloy. Furthermore, in one embodiment, third component portion 203 and fourth component portion 204 can be made of a material including aluminum. For example, in one embodiment, third component portion 203 and fourth component portion 204 can be made of an aluminum alloy. Also, in some cases, third component portion 203 can be made of an extruded aluminum alloy. In some cases, fourth component 204 can be made of a stamped aluminum alloy.

Materials used for different component portions of a composite component may be selected according to predetermined material properties. In some embodiments, the rigidity of each component portion can vary. In some cases, first component portion 201 and second component portion 202 can be substantially more rigid than third component portion 203. For example, in one embodiment, first component portion 201 and second component portion 202 can be made of a material including magnesium and third portion 203 and fourth portion 204 can be made of a material including aluminum, which is less rigid than magnesium.

Additionally, in some cases, first component portion 201 and second component portion 202 can be substantially more rigid than fourth component portion 204. For example, in embodiments where first component portion 201 and second component portion 202 are made of a material including magnesium, fourth portion 204 can be made of a material including aluminum. This arrangement provides for varying lateral rigidity over the length of composite component 102.

In this exemplary embodiment, a substantial majority of composite component 102 may be made of a material including magnesium. In some embodiments, both first lateral portion 222 and intermediate portion 224 may be made of a material including magnesium. In particular, first lateral portion 222 can correspond to a driver side portion of a motor vehicle while intermediate portion 224 can correspond to a center console portion of a motor vehicle. This arrangement can facilitate increased structural integrity for composite component 102.

In different embodiments, first knee bolster 251 and second knee bolster 252 may be made of various materials. In some cases, first knee bolster 251 and second knee bolster 252 may be made of a material including magnesium. In other cases, first knee bolster 251 and second knee bolster 252 may be made of a material including aluminum. In still other cases, first knee bolster 251 and second knee bolster 252 may be made of other materials.

In different embodiments, bracket portion 239 may also be made of various types of materials. In some cases, bracket portion 239 can be made of a material including magnesium, such as a magnesium alloy. In other cases, bracket portion 239 can be made of a material including aluminum, such as an aluminum alloy. In still other cases, bracket portion 239 can be made of other materials.

Figure 5:
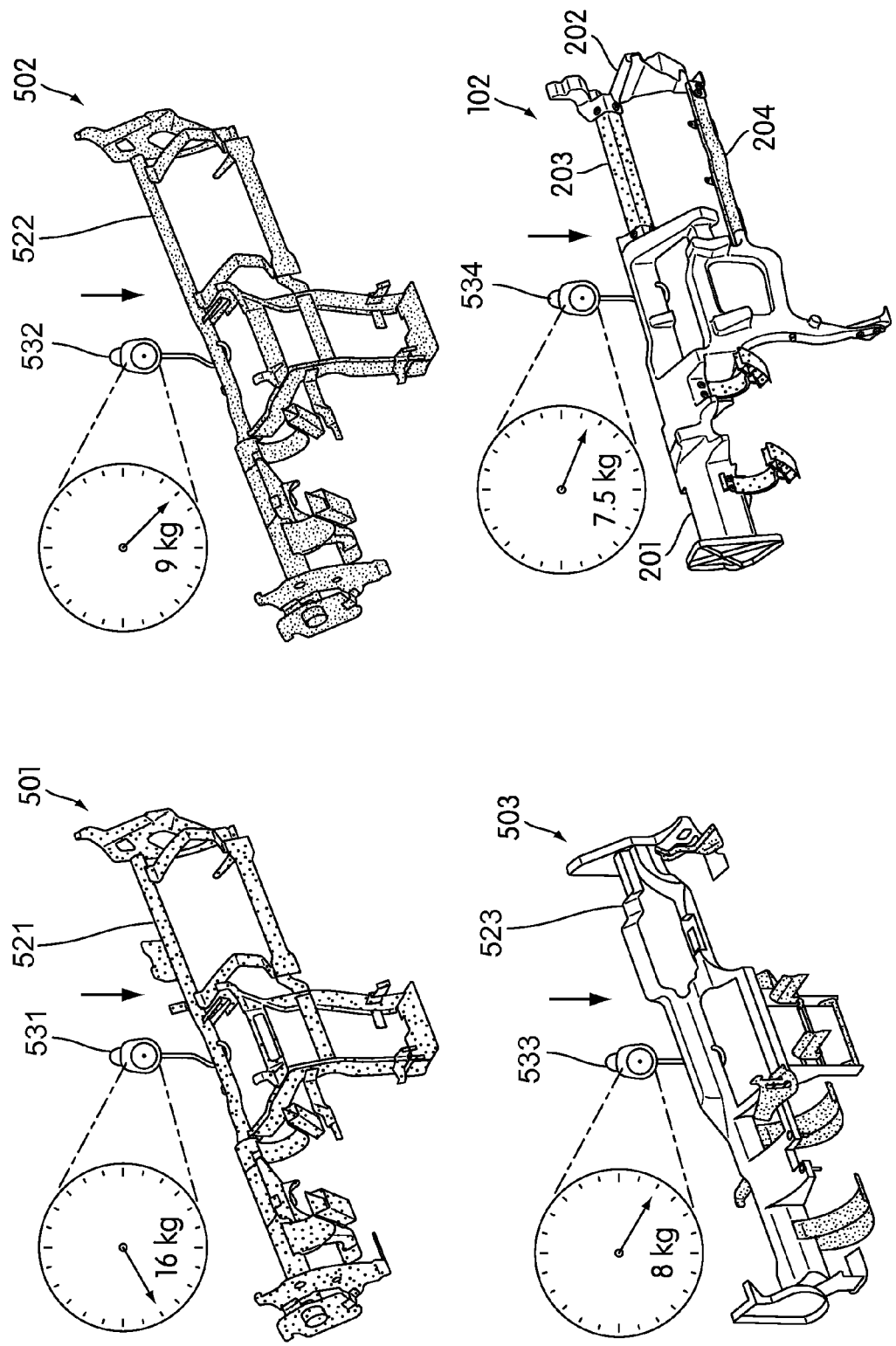
FIG. 5 is an isometric view of multiple alternative embodiments of composite components made of different materials with associated scales indicating the weight of the composite components.

FIG. 5 illustrates multiple alternative embodiments of composite components made of different materials. It should be understood that the following embodiments are intended to be illustrative only. In other embodiments, a composite component could be made of still other materials.

In some cases, first composite component 501 is made of steel. In particular, first composite component 501 comprises monolithic component portion 521 that extends the entire length of first composite component 501. First composite component 501 further comprises additional features that may be made of steel, including knee bolsters and brackets.

Second composite component 502 may be made of aluminum. In particular, second composite component 502 comprises monolithic component portion 522 that extends the entire length of second composite component 502. Second composite component 502 further comprises additional features that may be made of aluminum, including knee bolsters and brackets.

In some cases, third composite component 503 is made of a material including magnesium, such as a magnesium alloy. In particular, third composite component 503 comprises monolithic component portion 523 that extends the entire length of third composite component 503. Third composite component 503 further comprises additional features that may be made of steel, including knee bolsters and brackets. In some cases, the knee bolsters and brackets associated with third composite component 503 may be made of aluminum or an aluminum alloy.

As previously discussed, composite component 102 may be made of component portions comprising materials including magnesium and component portions comprising materials including aluminum. In particular, in one embodiment, composite component 102 includes first component portion 201 and second component portion 202 that are made of a material including magnesium. Also, in one embodiment, composite component 102 includes third component portion 203 and fourth component portion 204 that are made of a material including aluminum.

FIG. 5 further illustrates the various weights of first composite component 501, second composite component 502, third composite component 503 and composite component 102, as shown schematically by first scale 531, second scale 532, third scale 533 and fourth scale 534, respectively. As indicated by first scale 531, first composite component 501 weighs approximately 16 kilograms. As indicated by second scale 532, second composite component 502 weighs approximately 9 kilograms. As indicated by third scale 533, third composite component 503 weighs approximately 8 kilograms.

The weight of composite component 102 is also indicated using fourth scale 534. In some cases, composite component 102 may weigh approximately 7.5 kilograms. As illustrated here, composite component 102 weighs substantially less than first composite component 501 and second composite component 502, which are made of steel and aluminum, respectively. Also, composite component 102 weighs substantially less than third composite component 503, which is made of a monolithic piece of magnesium. In other words, a design with a combination of materials including magnesium and materials including aluminum allows for reduced weight of composite component 102 while maintaining strength and support for the cockpit assembly.

Although the previous embodiments discussed a composite component for a motor vehicle, in other embodiments any frame member used to reinforce or strengthen a portion of a motor vehicle can be constructed using two or more distinct materials. For example, in one embodiment, a frame member could be used as part of a body of a motor vehicle. In another example, a frame member could be used as part of a subframe for a suspension system.

Figure 6:
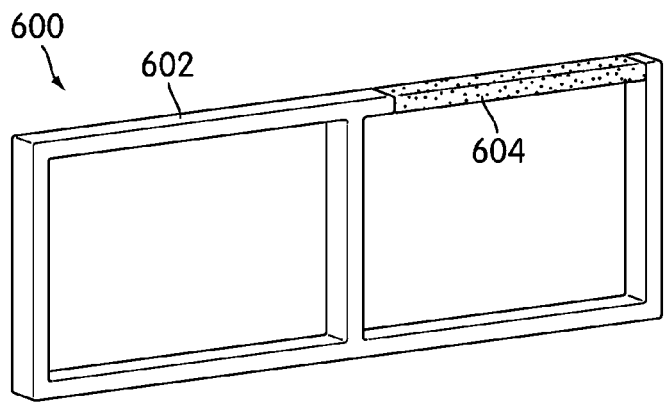
FIG. 6 is a schematic view of an embodiment of a frame member using two distinct materials.
Figure 7:
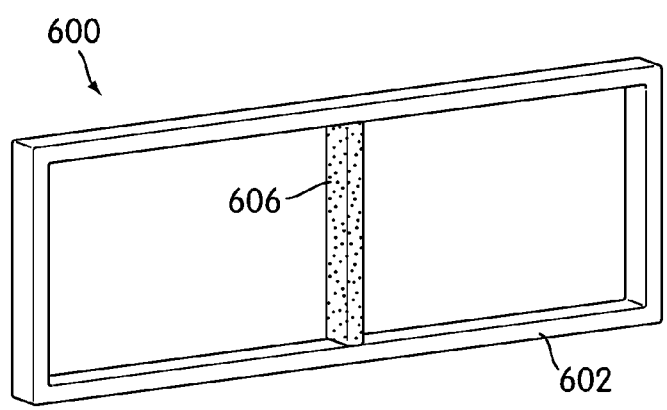
FIG. 7 is a schematic view of an embodiment of a frame member using two distinct materials.
Figure 8:
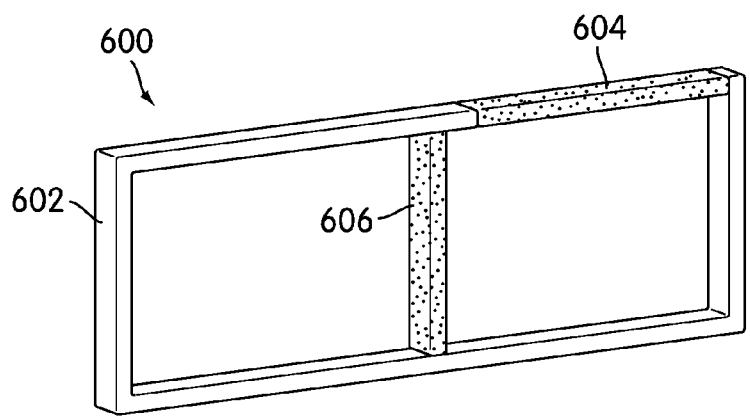
FIG. 8 is a schematic view of an embodiment of a frame member using two distinct materials.

FIGS. 6 through 8 illustrate embodiments of a frame member made using two distinct materials. In one embodiment, illustrated in FIG. 6, frame member 600 includes first monolithic portion 602 and second monolithic portion 604. In this embodiment, second monolithic portion 604 corresponds to a portion of the outer periphery of frame member 600. In some cases, first monolithic portion 602 can be made of a material including magnesium. Also, second monolithic portion 604 can be made of a material including aluminum. With this arrangement, the weight of frame member 600 may be less than a frame member comprising a single monolithic portion of magnesium. Also, second monolithic portion 604 can be easily modified to include provisions for associating other components with frame member 600.

In another embodiment, illustrated in FIG. 7, the location of another monolithic portion can be changed with respect to first monolithic portion 602. In this alternative embodiment, third monolithic portion 606 corresponds to a cross bar of frame member 600. In still another embodiment, illustrated in FIG. 8, frame member 600 includes first monolithic portion 602, second monolithic portion 604 and third monolithic portion 606. In this embodiment, second monolithic portion 604 and third monolithic portion 606 correspond to the outer periphery and a cross bar, respectively, of frame member 600. By changing the location of a second monolithic portion with respect to a first monolithic portion where the first monolithic portion and second monolithic portion comprise different materials, the overall strength of the frame member can be fine tuned. Furthermore, by varying the number of distinct monolithic portions of differing materials, the overall weight of the frame member can be fine tuned. In some cases, this arrangement can help reduce manufacturing costs.

Figure 9:
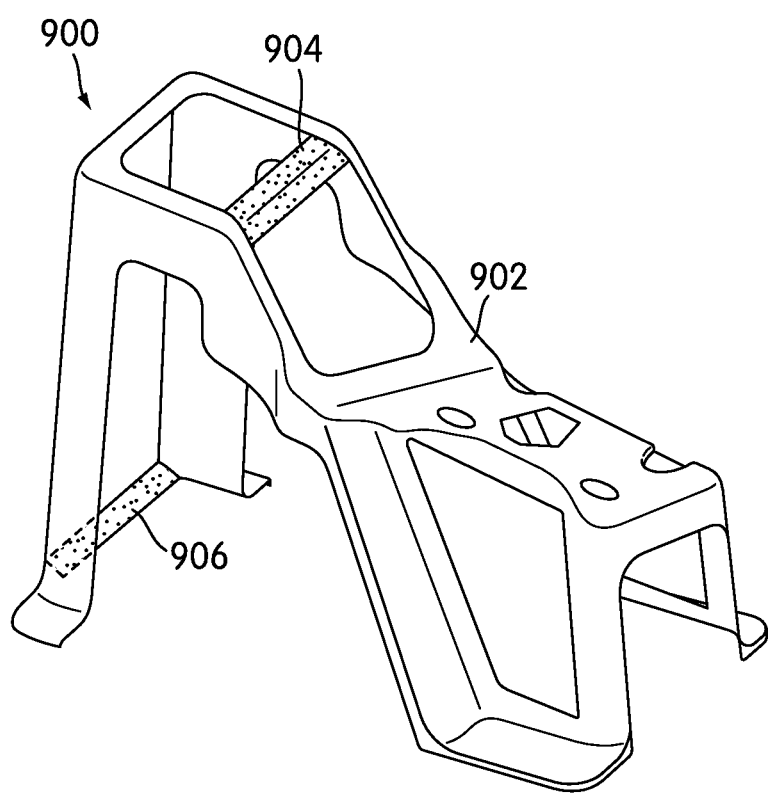
FIG. 9 is an isometric view of an embodiment of a center console frame for a motor vehicle.

FIG. 9 illustrates an embodiment of center console frame 900 for a motor vehicle. Center console frame 900 may be associated with a center console in a cabin of a motor vehicle. In some cases, center console frame 900 can comprise distinct portions. In other cases, center console frame 900 can comprise a single monolithic portion comprising a single material.

In an exemplary embodiment, center console frame 900 comprises first component portion 902, second component portion 904 and third component portion 906. First component portion 902 forms a bulk of center console frame 900 and is made of a first material. Second component portion 904 and third component portion 906 are individual cross beam members and are made of a second material that is distinct from the first material. In some cases, the first material may include magnesium. In some cases, the second material may include aluminum. In other cases, different materials can be used for first component portion 902, second component portion 904 and third component portion 906. Using this exemplary arrangement, the weight and strength of center console frame 900 can be fine tuned.

FIGS. 10 through 16 are intended to illustrate an embodiment of a process for manufacturing a component for a motor vehicle. In particular, FIGS. 10 through 16 illustrate a process of creating a composite component for a motor vehicle using a die assembly. It should be understood that the process discussed in this detailed description could also be used for manufacturing other composite components that may be made using a die casting process. In other words, the process described below is not limited to a method of making a composite component for a motor vehicle.

Figure 10:
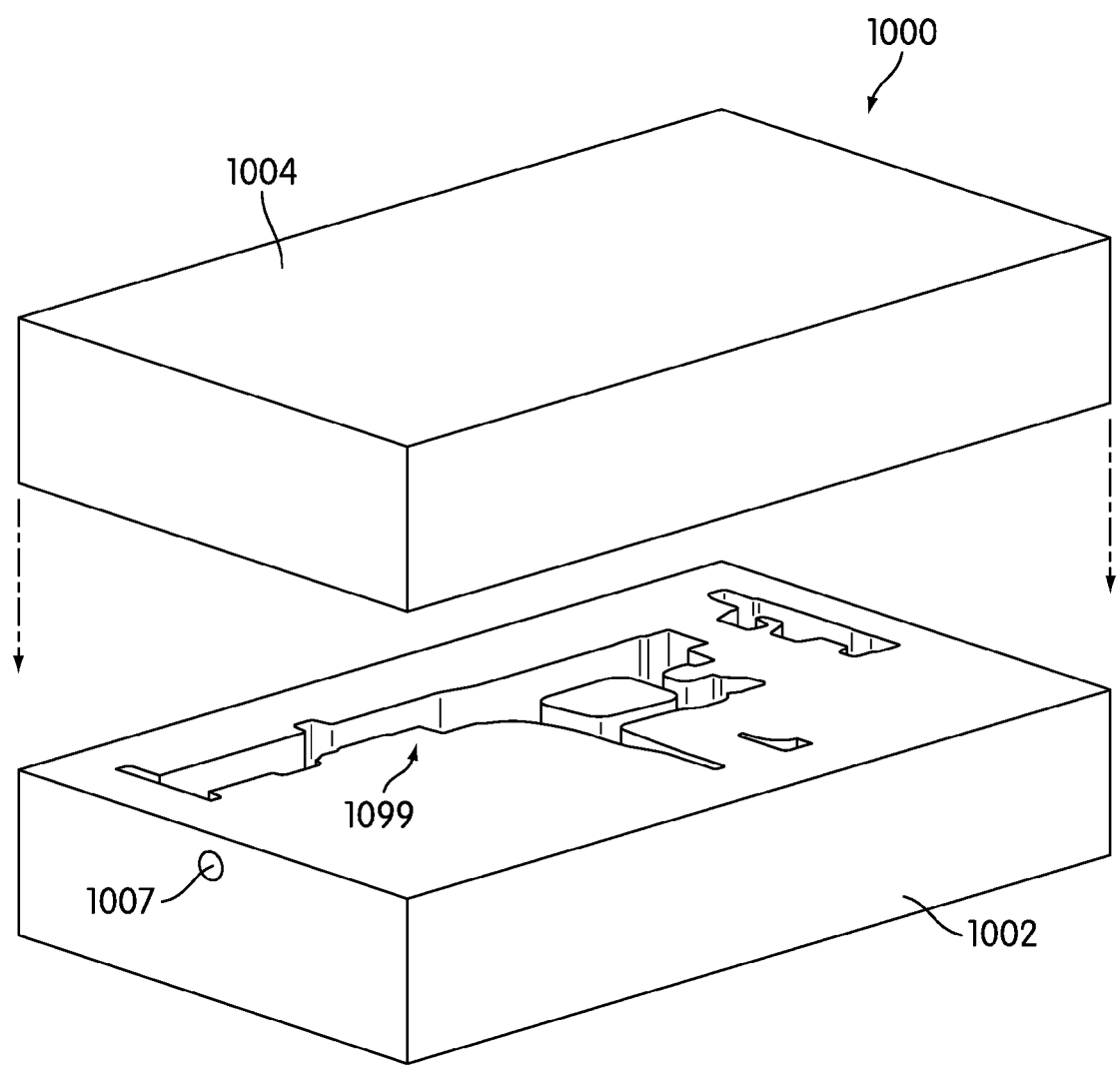
FIG. 10 is an isometric view of an embodiment of a die assembly used to make portions for a composite component.

FIG. 10 is an exploded isometric view of first die assembly 1000. First die assembly 1000 includes fixed die 1002 and movable die 1004. For purposes of illustration, first die assembly 1000 is shown schematically. However, it should be understood that in some cases first die assembly 1000 may include various other components that are commonly incorporated into a die assembly. For example, first die assembly 1000 could further include one or more platens for holding fixed die 1002 and movable die 1004. Also, in some cases, first die assembly 1000 could include ejector pins for facilitating removal of molded pieces.

In some embodiments, first die assembly 1000 may include one or more orifices for receiving a casting material. In one embodiment, first die assembly 1000 may include orifice 1007. In some cases, orifice 1007 may be configured to receive a nozzle for injecting a metal or metal alloy into fixed die 1002 and movable die 1004. Also, orifice 1007 may be in fluid communication with one or more channels disposed within fixed die 1002 and/or moveable die 1004. For purposes of clarity, the channels configured to deliver casting material to various cavities within die assembly 1000 are not illustrated in this embodiment.

Generally, first die assembly 1000 could be associated with any type of die casting process. For example, in some embodiments first die assembly 1000 could be used with a pore free casting process. In other embodiments, first die assembly 1000 could be used with a direct-injection casting process. Furthermore, first die assembly 1000 could be associated with a hot-chamber process. Also, in some cases, first die assembly 1000 could be associated with a cold-chamber process.

In an exemplary embodiment, first die assembly 1000 may be used to make one or more portions of a composite component that may be used to provide support to an instrument panel and/or a steering column of a motor vehicle. In some cases, first die assembly 1000 may include one or more cavities that are used for forming portions of a composite component. In particular, the one or more cavities may be shaped in a manner that produces predetermined components during the die casting process. In one embodiment, first die assembly 1000 includes plurality of cavities 1099. In some cases, plurality of cavities 1099 may include multiple cavities that are configured for forming one or more portions of a composite component.

Referring to FIG. 10, during a first step of making a composite component, moveable die 1004 may be moved towards fixed die 1002. In some cases, moveable die 1004 and fixed die 1002 can include alignment features to help facilitate a proper closing of first die assembly 1000. Furthermore, in some cases, moveable die 1004 and fixed die 1002 can include fastener holes that are configured to receive screws and/or bolts that can be used to fasten moveable die 1004 and fixed die 1002 together.

Figure 11:
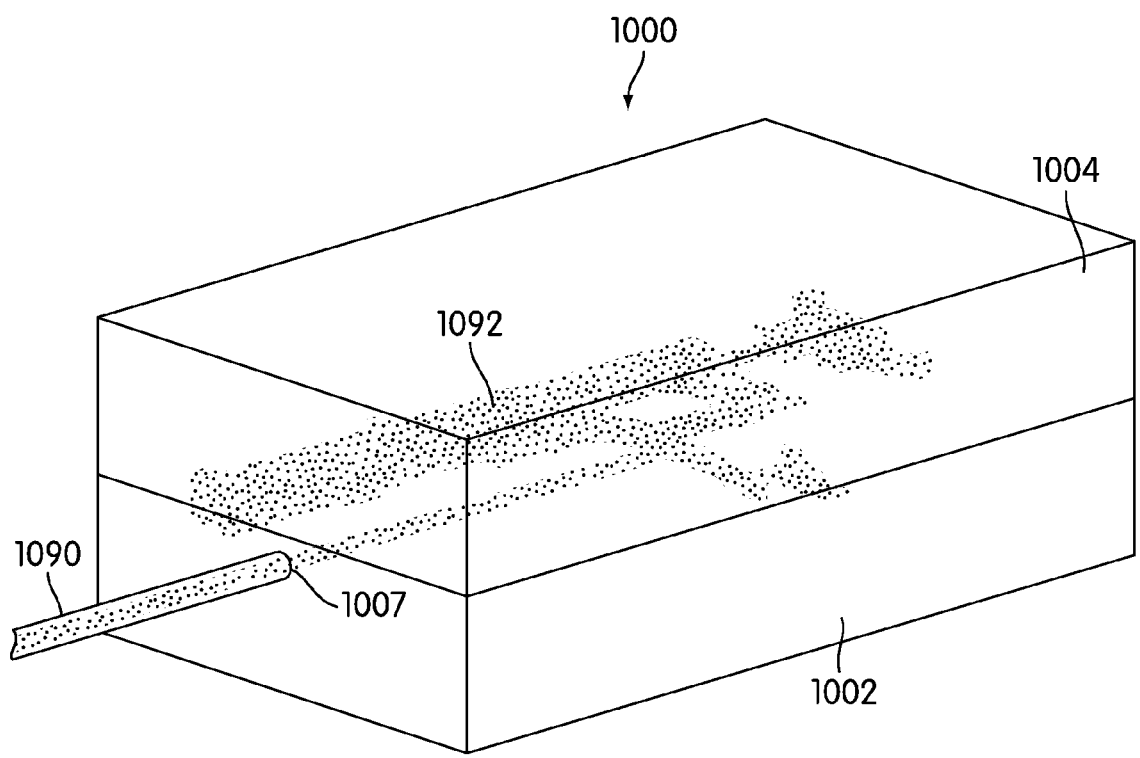
FIG. 11 is an isometric view of an embodiment of a die assembly filling with casting material.

Referring to FIG. 11, nozzle 1090 may be associated with orifice 1007. In some cases, nozzle 1090 may be connected with a pressurized chamber that includes some type of casting material 1092. At this point, casting material 1092 can be injected into first die assembly 1000. As casting material 1092 flows through one or more channels of first die assembly 1000, casting material 1092 may fill cavities disposed within first die assembly 1000. With this arrangement, casting material 1092 may be formed into a predetermined shape according to the shape of the interior cavities.

In different embodiments, the materials used with first die assembly 1000 may vary. Examples of different materials that may be used for die casting include, but are not limited to, steel, aluminum, aluminum alloys, magnesium, magnesium alloys as well as other materials. In one embodiment, first die assembly 1000 can be used with a material including magnesium to produce die cast parts including magnesium for a composite component. In another embodiment, first die assembly 1000 can be used with a magnesium alloy to produce magnesium alloy die cast parts for a composite component.

Once the casting material has cooled and set, moveable die 1004 can be separated from fixed die 1002. At this point, the die cast parts can be removed from first die assembly 1000. In some cases, first die assembly 1000 can have one or more ejectors pins that help facilitate the removal of the die cast parts. In other cases, the die case parts can be removed by hand, once the parts have cooled.

Figure 12:
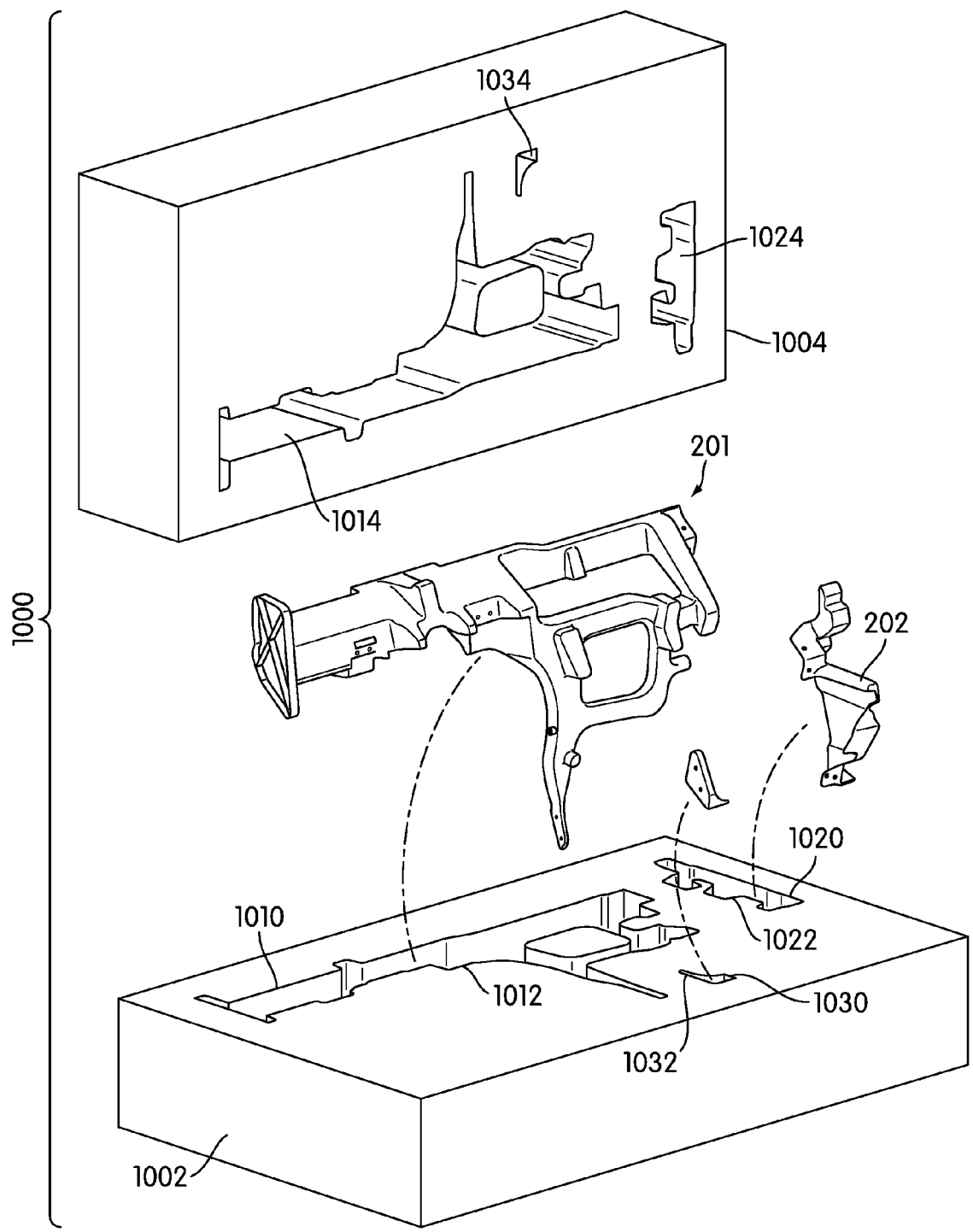
FIG. 12 is an exploded isometric view of an embodiment of a die assembly used to make portions for a composite component.

FIG. 12 is an exploded isometric view of first die assembly 1000, including a plurality of die cast parts. Referring to FIG. 12, first die assembly 1000 may include first die cavity 1010. First die cavity 1010 may include first lower cavity portion 1012 and first upper cavity portion 1014 disposed on fixed die 1002 and movable die 1004, respectively. In an exemplary embodiment, first die cavity 1010 may be shaped to form first component portion 201.

First die assembly 1000 may also include second die cavity 1020. Second die cavity 1020 may include second lower cavity portion 1022 and second upper cavity portion 1024 disposed on fixed die 1002 and moveable die 1004, respectively. In this exemplary embodiment, second die cavity 1020 may be shaped to form second component portion 202.

First die assembly 1000 may also include third die cavity 1030. Third die cavity 1030 may include third lower cavity portion 1032 and third upper cavity portion 1034 disposed on fixed die 1002 and moveable die 1004, respectively. In an exemplary embodiment, third die cavity 1030 may be used to form bracket portion 239. In some embodiments, bracket portion 239 may be configured to associate with first component portion 201.

As previously discussed, the materials used for making first component portion 201, second component portion 202 and bracket portion 239 may vary. In some cases, first component portion 201, second component portion 202 and bracket portion 239 may be made of a material including aluminum. In this exemplary embodiment, first component portion 201, second component portion 202 and bracket portion 239 may be made of a material including magnesium. In some cases, first component portion 201, second component portion 202 and bracket portion 239 can be made of a magnesium alloy.

Figure 13:
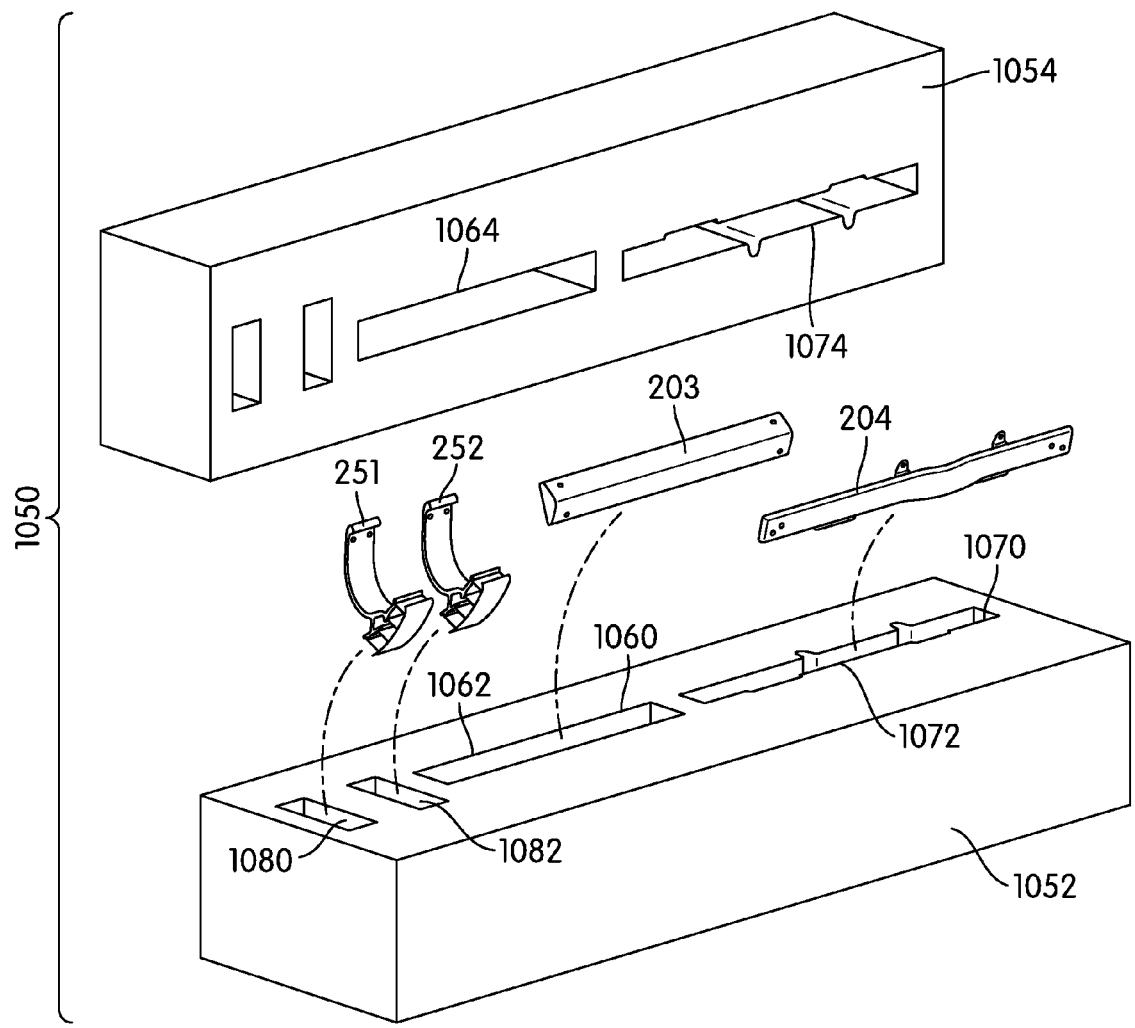
FIG. 13 is an exploded isometric view of an embodiment of a die assembly.

Referring to FIG. 13 second die assembly 1050 may be used for making additional parts of a composite component. In some embodiments, second die assembly 1050 may comprise fixed die 1052 and moveable die 1054. In some cases, second die assembly 1050 may include one or more cavities that are used for forming portions of a composite component. In some embodiments, second die assembly 1050 may include first die cavity 1060. First die cavity 1060 may include first lower cavity portion 1062 and first upper cavity portion 1064 disposed on fixed die 1052 and movable die 1054, respectively. In an exemplary embodiment, first die cavity 1060 may be shaped to form third component portion 203.

Also, second die assembly 1050 may include second die cavity 1070. Second die cavity 1070 may include second lower cavity portion 1072 and second upper cavity portion 1074 disposed on fixed die 1052 and moveable die 1054, respectively. In this exemplary embodiment, second die cavity 1070 may be shaped to form fourth component portion 204. In some cases, third component portion 203 may be a beam or bar that is used in making a composite component, such as a hanger beam. Additionally, in some cases, fourth component portion 204 may be a beam that is used in making a composite component. In other cases, fourth component portion 204 may be a bracket. For example, in an embodiment in which the composite component is a hanger beam for an instrument panel, fourth portion 204 may be a bracket that is configured to associate with one or more components of the instrument panel.

Second die assembly 1050 may also include third die cavity 1080 and fourth die cavity 1082. In some cases, third die cavity 1080 and fourth die cavity 1082 may include upper and lower cavities associated with fixed die 1052 and moveable die 1054, respectively. In one embodiment, third die cavity 1080 and fourth die cavity 1082 may be used for forming first knee bolster 251 and second knee bolster 252.

In different embodiments, the materials used with second die assembly 1050 may vary. Examples of different materials that may be used for die casting include, but are not limited to, steel, aluminum, aluminum alloys, magnesium, magnesium alloys as well as other materials. In one embodiment, second die assembly 1050 can be used with a material including aluminum to produce aluminum die cast parts for a composite component. In some other embodiments, second die assembly 1050 can be used with aluminum alloys to produce aluminum alloy die cast parts for a composite component. In an exemplary embodiment, third component portion 203, fourth component portion 204, first knee bolster 251 and second knee bolster 252 may be made of a material including aluminum. For example, in one embodiment, third component portion 203, fourth component portion 204, first knee bolster 251 and second knee bolster 252 may be aluminum alloy pieces.

Once the portions of a composite component have been made, these portions can be assembled in a manner previously discussed with respect to FIGS. 2 and 3. In particular, first component portion 201 and second component portion 202 can be joined using third component portion 203 and fourth component portion 204. Additionally, first knee bolster 251, second knee bolster 252 and bracket portion 239 can be assembled with first component portion 201.

A method of making a composite component for a motor vehicle can include provisions for minimizing the size of a die used for forming one or more portions of the composite component. This may be useful in situations where larger dies are not available or in situations where the use of a larger die may substantially increase the manufacturing costs of a particular part.

Figure 14:
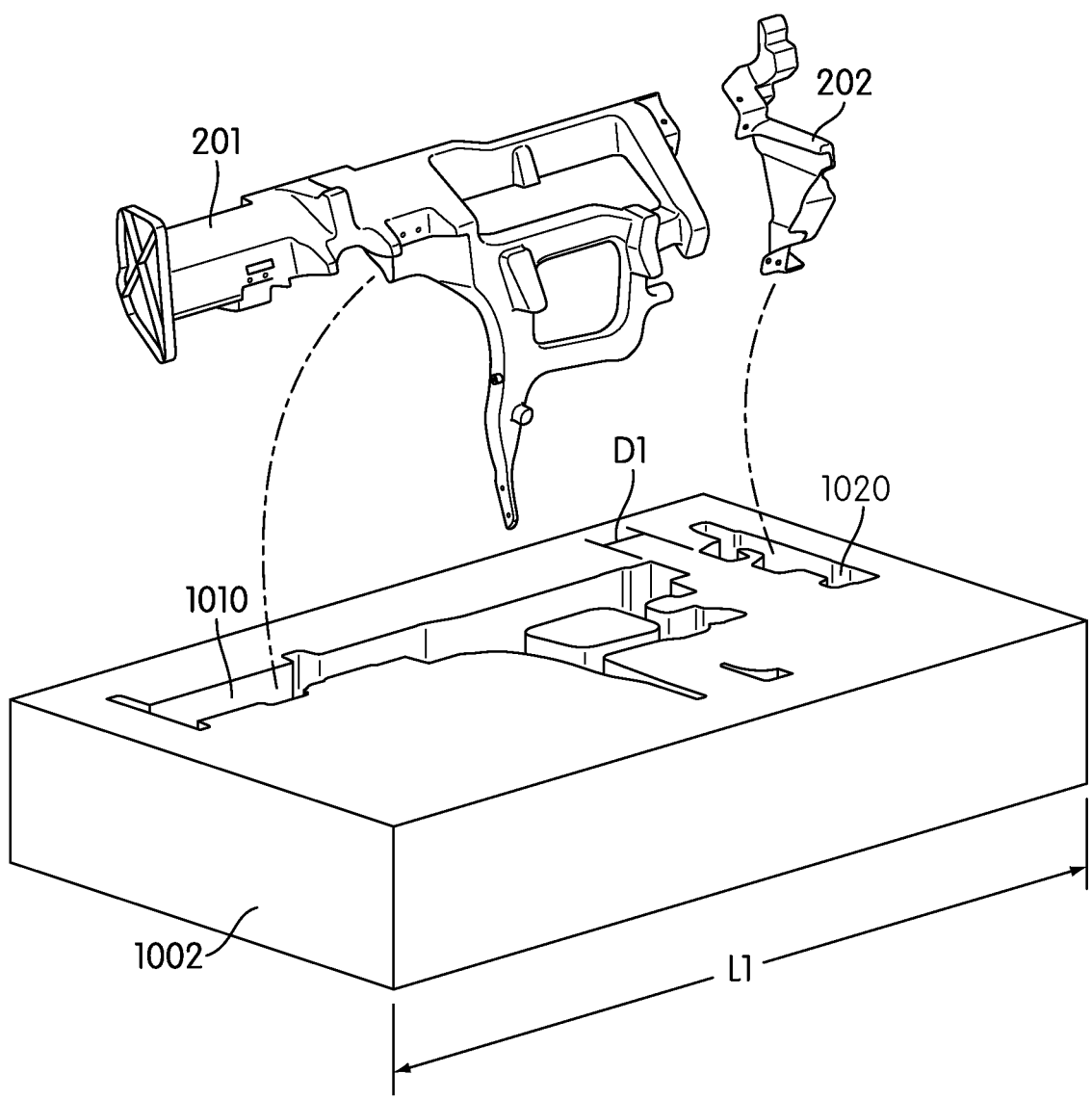
FIG. 14 is an isometric view of an embodiment of a die assembly.

Referring to FIG. 14, first die cavity 1010 and second die cavity 1020 of fixed die 1002 may be spaced apart by a distance D1 with respect to a longitudinal direction that is directed along the length of fixed die 1002. Because first die cavity 1010 and second die cavity 1020 have irregular shapes, the distance between first die cavity 1010 and second die cavity 1020 can vary slightly. Therefore, in some cases, D1 could be an average distance between the ends of first die cavity 1010 and second die cavity 1020. In other cases, distance D1 could be a minimum distance between two adjacent ends of first die cavity 1010 and second die cavity 1020.

In some embodiments, distance D1 can be selected to be substantially smaller than the length of third component portion 203. In some cases, distance D1 can be substantially smaller than the length of first die cavity 1010. Also, in some cases, distance D1 can be smaller than the length of second die cavity 1020. With this arrangement, first die cavity 1010 and second die cavity 1020 can arranged within first die assembly 1000 in a manner that minimizes length L1 of first die assembly 1000.

Figure 15:
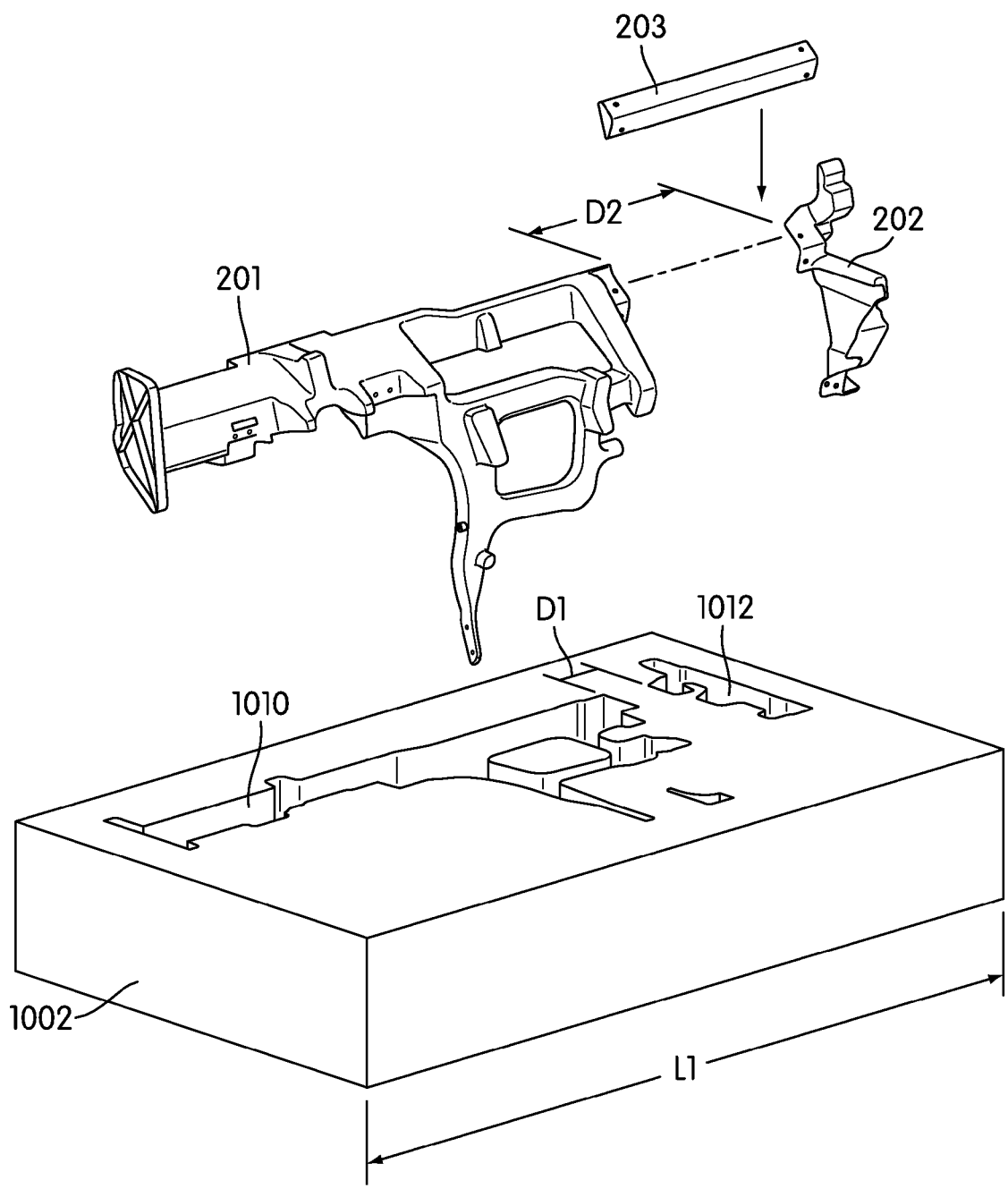
FIG. 15 is an isometric view of an embodiment of a die assembly.

Referring to FIG. 15, once first component portion 201 and second component portion 202 have been formed, third component portion 203 may be associated with first component portion 201 and second component portion 202. In particular, first component portion 201 and second component portion 202 may be separated to a distance D2 so that third component portion 203 may be inserted between first component portion 201 and second component portion 202. In some cases, distance D2 may be substantially larger than distance D1.

Figure 16:
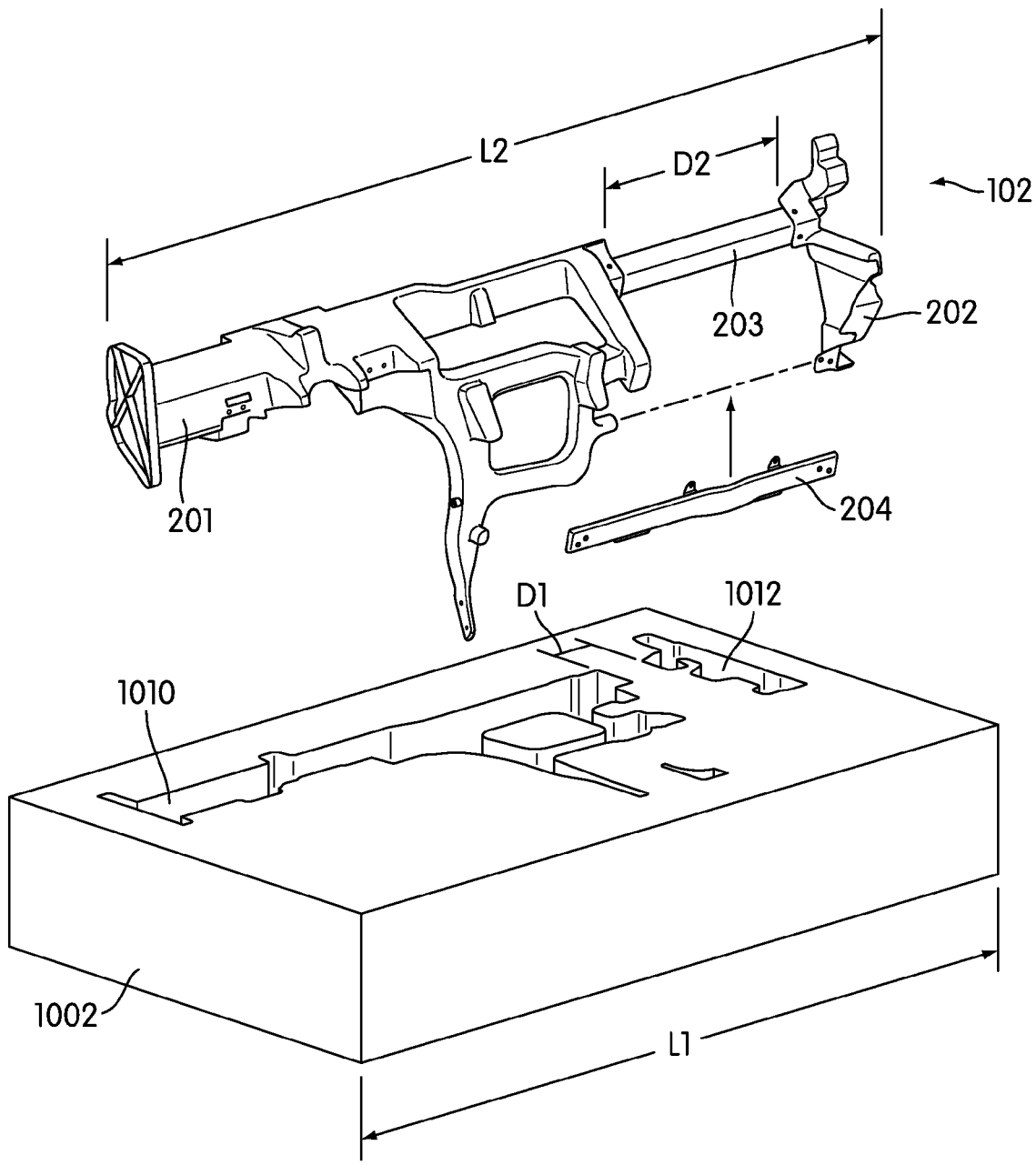
FIG. 16 is an isometric view of an embodiment of a die assembly.

Referring to FIG. 16, fourth component portion 204 may also be associated with first component portion 201 and second component portion 202. In particular, fourth component portion 204 may be inserted between first component portion 201 and second component portion 202. In some cases, fourth component portion 204 may be aligned in a generally parallel manner with third component portion 203.

In some cases, third component portion 203 may be made using a die casting process, as previously illustrated in FIG. 13. In other cases, however, third component portion 203 may be made using an extrusion process. Likewise, in some cases, fourth component portion 204 could also be made using a die casting process. In other cases, fourth component portion 204 could be made using an extrusion process. By using various processes, third component portion 203 and/or fourth component portion 204 can be formed into different kinds of shapes. For example, using an extrusion process, third component portion 203 could be formed with an approximately cylindrical shape.

With this arrangement, first component portion 201, second component portion 202 and third component portion 203 can be assembled into composite component 102 that is substantially longer than first die assembly 1000. In other words, this method provides a way of reducing the size of a die assembly needed to form portions of a composite component. In this exemplary embodiment, for example, composite component 102 may have a length L2 that is substantially longer than length L1 of first die assembly 1000. Using this arrangement, manufacturing costs can be reduced over methods using a single die to cast a full length composite component.

In embodiments where multiple die assemblies may be used for manufacturing different components in a motor vehicle, a die assembly may include provisions for maximizing the space used in a single die. In some embodiments, a single die assembly can be used to produce multiple portions that may be used in different predetermined regions of a motor vehicle.

Figure 17:
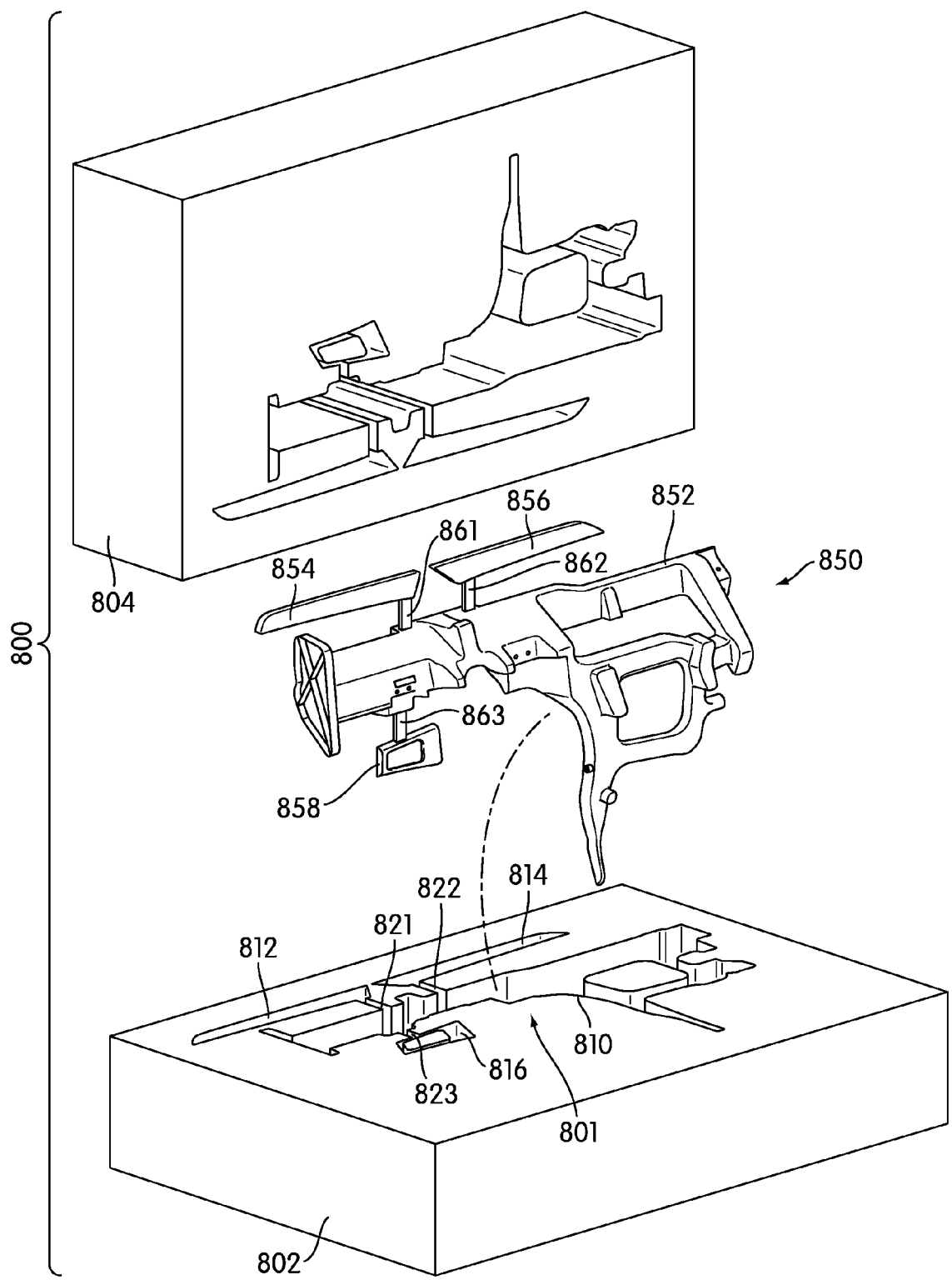
FIG. 17 is an exploded isometric view of an embodiment of a die assembly used to make a compound portion.

Referring to FIG. 17, die assembly 800 includes moveable die 804 and fixed die 802. Furthermore, die assembly 800 may include die cavity 801. In some cases, die cavity 801 may include one or more sub-cavities. In one embodiment, die cavity 801 includes first sub-cavity 810. In some cases, first sub-cavity 810 may be shaped to form a portion of a composite component, such as a hanger beam. In other cases, however, first sub-cavity 810 could have another shape.

Die cavity 801 may also include second sub-cavity 812 and third sub-cavity 814. In some embodiments, second sub-cavity 812 and third sub-cavity 814 may be shaped to form styling panels for a door of a motor vehicle. In some cases, second sub-cavity 812 and third sub-cavity 814 may have substantially similar shapes. In other cases, second sub-cavity 812 and third sub-cavity 814 may have different shapes.

Die cavity 801 may also include fourth sub-cavity 816. In some embodiments, fourth sub-cavity 816 may be shaped to form a molding piece for a handle of a motor vehicle door. In other embodiments, fourth sub-cavity 816 can be shaped to form another type of molding piece.

In some embodiments, sub-cavities of die cavity 801 may be connected by one or more channels. In this exemplary embodiment, second sub-cavity 812 and third sub-cavity 814 are in fluid communication with first sub-cavity 810 via first channel 821 and second channel 822, respectively. Likewise, fourth sub-cavity 816 may be in fluid communication with first sub-cavity 810 via third channel 823. With this arrangement, casting material can evenly fill each sub-cavity of die cavity 801.

In one embodiment, die assembly 800 may be used to make compound portion 850, as illustrated in FIG. 17. The term "compound portion" as used throughout this detailed description and in the claims refers to a collection of multiple component portions that are formed as a single monolithic portion during a molding process. In particular, a compound portion includes multiple component portions that are configured to be separated following the die cast process.

Compound portion 850 may include two or more portions joined to one another. In this embodiment, compound portion 850 includes first component portion 852. Compound portion 850 may also comprise second component portion 854 and third component portion 856. Compound portion 850 may further comprise fourth component portion 858. In some cases, second component portion 854, third component portion 856 and fourth component portion 858 may be integrally formed with first component portion 852. For example, in this embodiment, second component portion 854 may be attached to first component portion 852 via first connecting portion 861. Third component portion 856 may be attached to first component portion 852 via second connecting portion 862. Also, fourth component portion 858 may be attached to first component portion 852 via third connecting portion 863.

Figure 18:
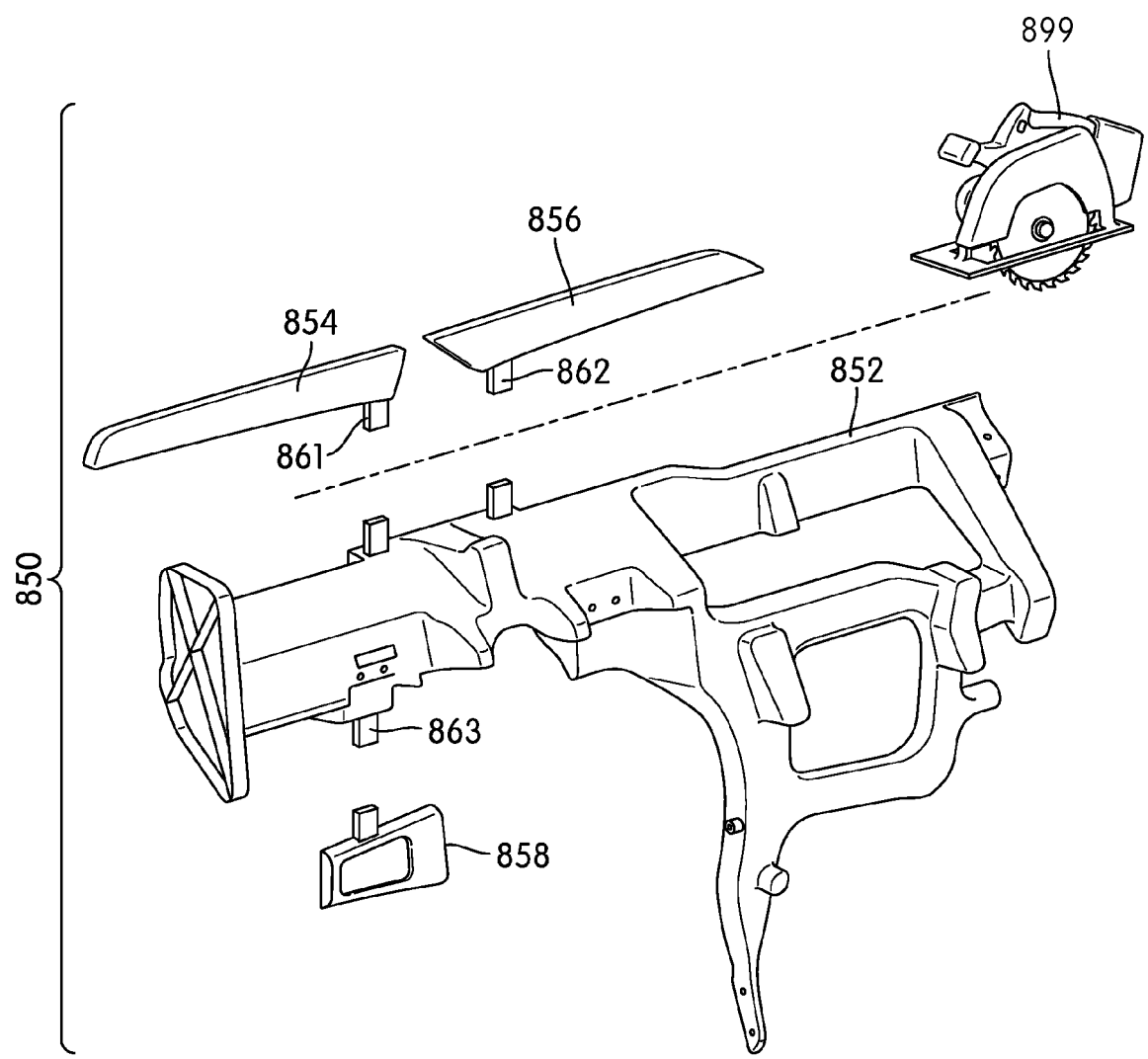
FIG. 18 is an isometric view of an embodiment of a compound portion being cut into separate portions.

Referring to FIG. 18, during a process for making multiple components of a motor vehicle, one or more component portions may be separated from compound portion 850. In one embodiment, saw 899 may be used to cut first connecting portion 861, second connecting portion 862 and third connecting portion 863. Although a saw is used in this embodiment, in other embodiments other methods may be used for separating first connecting portion 861, second connecting portion 862 and third connecting portion 863. For example, in another embodiment, a laser could be used to cut one or more connecting portions.

For purposes of illustration, the sizes of first connecting portion 861, second connecting portion 862 and third connecting portion 863 are exaggerated. In some cases, once one or more connecting portions have been cut, some excess material may remain on various portions. In some embodiments, this excess material may be removed using, for example, sanding, cutting, or other methods.

In some embodiments, first component portion 852 may be combined with additional component portions to form a composite component. In some cases, first component portion 852 may be assembled with component portions that have been made using a similar die casting process. In particular, first component portion 852 can be assembled with component portions similar to those discussed in the previous embodiments for making a composite component.

Figure 19:
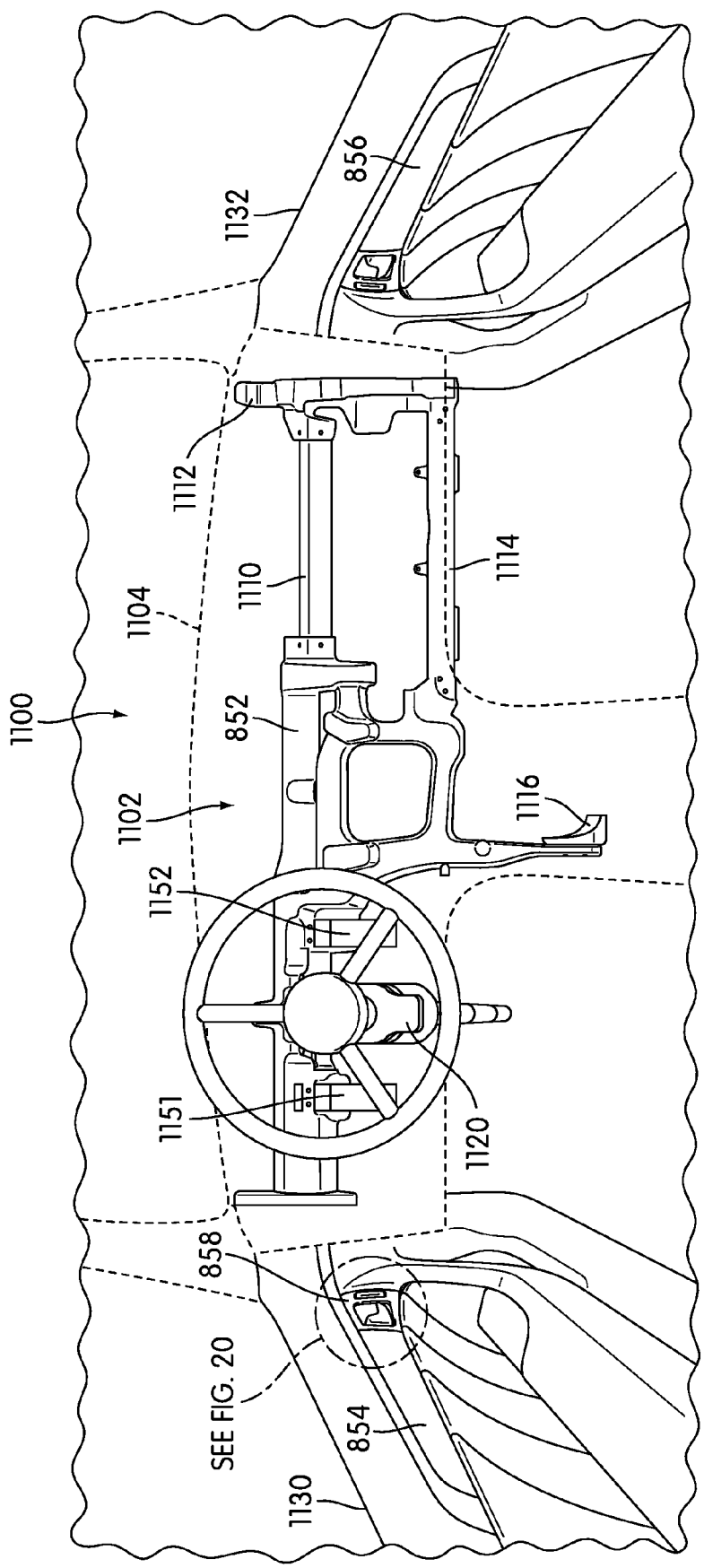
FIG. 19 is a front view of an embodiment of an interior cabin of a motor vehicle.

FIG. 19 illustrates a front view of interior cabin 1100 of a motor vehicle. Referring to FIG. 19, first component portion 852 has been assembled with first hanger beam portion 1110, second hanger beam portion 1112 and third hanger beam portion 1114 to form composite component 1102. Also, first component portion 852 has been assembled with first knee bolster 1151, second knee bolster 1152 and bracket portion 1116. In some cases, composite component 1102 may be further associated with steering column assembly 1120.

Composite component 1102, including first component portion 852 may be associated with a first predetermined region of interior cabin 1100. In this case, composite component 1102 may be installed behind instrument panel 1104. For purposes of illustration, instrument panel 1104 is shown here in phantom.

In a similar manner, second component portion 854 may be associated with a second predetermined portion of interior cabin 1100. For example, in one embodiment, second component portion 854 may be associated with first door 1130. In particular, second component portion 854 may be assembled as a trim piece for first door 1130. Likewise, third component portion 856 can be associated with second door 1132. In particular, third component portion 856 can be provided as a trim piece for second door 1132.

Figure 20:
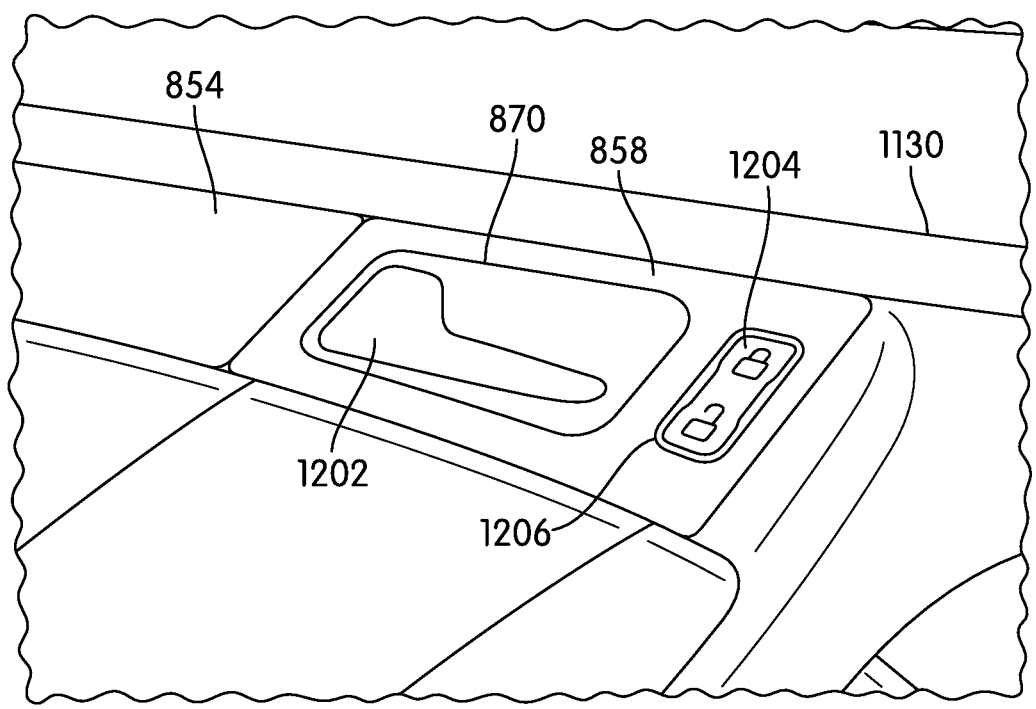
FIG. 20 is an enlarged view of an embodiment of a portion of a door of a motor vehicle.

Referring to FIGS. 19 and 20, fourth component portion 858 can also be associated with first door 1130. In some cases, fourth component portion 858 includes first gap 870 that is configured to receive handle 1202. Likewise, fourth component portion 858 includes second gap 1206 that is configured to receive lock button 1204. With this arrangement, fourth component portion 858 is configured to provide a stylized trim for handle 1202 and lock button 1204.

This preferred arrangement can provide for decreased manufacturing costs by using a single die assembly to produce multiple distinct component portions to be used in a motor vehicle. In particular, the number of steps used to create multiple component portions that correspond to different predetermined regions of a motor vehicle can be reduced over traditional methods.

Although the current embodiment discusses a method of making multiple portions that are associated with different predetermined regions of a motor vehicle, it should be understood that this process is not limited to being used with a motor vehicle. In general, the process discussed here can be applied to any traditional die casting process to increase the overall efficiency of the die casting process.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of making components for a motor vehicle, comprising the steps of:
    using a die assembly to form a compound portion, the compound portion comprising a first component portion integrally formed with a second component portion;
    separating the first component portion from the second component portion;
    attaching the first component portion to a first predetermined region of the motor vehicle and attaching the second component portion to a second predetermined region of the motor vehicle;
    wherein the first predetermined region is a portion of an interior cabin of the motor vehicle associated with an instrument panel;
    wherein the die assembly is associated with at least one die cavity configured to form the compound portion using a die casting process; and
    wherein the die casting process includes filling the at least one die cavity with casting material during a single injection to form the compound portion.

2. The method according to claim 1, wherein the first component portion is made of a material including magnesium.

3. The method according to claim 1, wherein the second component portion is made of a material including magnesium.

4. The method according to claim 1, wherein the step of separating the first component portion from the second component portion includes a step of assembling the first component portion with a third component portion to form a composite component.

5. The method according to claim 4, wherein the third component portion is made of a material including aluminum.

6. The method according to claim 5, wherein the step of attaching the first component portion to the first predetermined region includes attaching the composite component to the first predetermined region.

7. The method according to claim 1, wherein the second predetermined region is a door of the motor vehicle.

8. The method according to claim 1, wherein the first component portion is associated with a hanger beam of the motor vehicle configured to provide support to the instrument panel.

9. The method according to claim 1, wherein the second component portion is a molding piece configured to frame a handle of a door of the motor vehicle.

10. A method of making components for a motor vehicle, comprising the steps of:
    using a die assembly to form a compound portion made of a first material, the compound portion comprising a first portion integrally formed with a second portion;
    separating the first portion from the second portion;
    assembling the first portion with a third portion made of a second material and thereby forming a composite component, the second material being different from the first material;
    attaching the composite component to a first predetermined region of the motor vehicle and attaching the second portion to a second predetermined region of the motor vehicle;
    wherein the second predetermined region is a door of the motor vehicle;
    wherein the die assembly is associated with at least one die cavity configured to form the compound portion using a die casting process; and
    wherein the die casting process includes filling the at least one die cavity with casting material during a single injection to form the compound portion.

11. The method according to claim 10, wherein the first portion is associated with a hanger beam of the motor vehicle configured to provide support to an instrument panel.

12. The method according to claim 11, wherein the first predetermined region is a portion of an interior cabin associated with the instrument panel of the motor vehicle.

13. The method according to claim 10, wherein the second portion is a molding piece configured to frame a handle of a door of the motor vehicle.

14. A method of making components for a motor vehicle, comprising the steps of:
    using a die assembly to form a compound portion made of a first material, the compound portion comprising a first portion integrally formed with a second portion;
    separating the first portion from the second portion;
    assembling the first portion with a third portion made of a second material and thereby forming a composite component, the second material being different from the first material;
    attaching the composite component to a first predetermined region of the motor vehicle and attaching the second portion to a second predetermined region of the motor vehicle;
    wherein the first portion is associated with a hanger beam of the motor vehicle configured to provide support to an instrument panel;
    wherein the die assembly is associated with at least one die cavity configured to form the compound portion using a die casting process; and
    wherein the die casting process includes filling the at least one die cavity with casting material during a single injection to form the compound portion.

15. The method according to claim 14, wherein the first predetermined region is a portion of an interior cabin of the motor vehicle associated with the instrument panel.

16. The method according to claim 14, wherein the second predetermined region is a door of the motor vehicle.

17. The method according to claim 14, wherein the second portion is a molding piece configured to frame a handle of a door of the motor vehicle.

18. A method of making components for a motor vehicle, comprising the steps of:
    using a die assembly to form a compound portion, the compound portion comprising a first component portion integrally formed with a second component portion;
    separating the first component portion from the second component portion;
    attaching the first component portion to a first predetermined region of the motor vehicle and attaching the second component portion to a second predetermined region of the motor vehicle;
    wherein the first component portion is a hanger beam configured to provide support to an instrument panel of a motor vehicle;
    wherein the second component portion is a molding piece configured to frame a handle of a door of the motor vehicle;

wherein the die assembly is associated with at least one die cavity configured to form the compound portion using a die casting process; and wherein the die casting process includes filling the at least one die cavity with casting material during a single injection to form the compound portion.

19. The method according to claim 18, wherein the first component portion is made of a material including magnesium.

20. The method according to claim 18, wherein the second component portion is made of a material including magnesium.

21. The method according to claim 18, wherein the step of separating the first component portion from the second component portion includes a step of assembling the first component portion with a third component portion to form a composite component.

22. The method according to claim 21, wherein the third component portion is made of a material including aluminum.

23. The method according to claim 21, wherein the step of attaching the first component portion to the first predetermined region includes attaching the composite component to the first predetermined region.

\* \* \* \* \*